US007669015B2

(12) United States Patent
Dice et al.

(10) Patent No.: US 7,669,015 B2
(45) Date of Patent: Feb. 23, 2010

(54) METHODS AND APPARATUS TO IMPLEMENT PARALLEL TRANSACTIONS

(75) Inventors: David Dice, Foxborough, MA (US); Ori Shalev, Givat Shmuel (IL); Nir N. Shavit, Cambridge, MA (US)

(73) Assignee: Sun Microsystems Inc., Santa Clara, CA (US)

( * ) Notice: Subject to any disclaimer, the term of this patent is extended or adjusted under 35 U.S.C. 154(b) by 498 days.

(21) Appl. No.: 11/475,814

(22) Filed: Jun. 27, 2006

(65) Prior Publication Data

US 2007/0198519 A1      Aug. 23, 2007

Related U.S. Application Data

(60) Provisional application No. 60/789,483, filed on Apr. 5, 2006, provisional application No. 60/775,564, filed on Feb. 22, 2006, provisional application No. 60/775,580, filed on Feb. 22, 2006.

(51) Int. Cl.
    *G06F 12/00* (2006.01)
(52) U.S. Cl. ..................................... 711/152
(58) Field of Classification Search .................. 711/152
    See application file for complete search history.

(56) References Cited

U.S. PATENT DOCUMENTS

| | | | |
|---|---|---|---|
| 5,301,290 A | 4/1994 | Tetzlaff et al. | |
| 5,596,754 A | 1/1997 | Lomet | |
| 5,956,731 A * | 9/1999 | Bamford et al. | ............. 707/201 |
| 5,987,506 A | 11/1999 | Carter et al. | |
| 6,148,377 A | 11/2000 | Carter et al. | |
| 6,826,570 B1 | 11/2004 | Eshel et al. | |
| 7,395,263 B2 * | 7/2008 | McKenney | ..................... 707/8 |
| 2004/0117531 A1 | 6/2004 | McKenney | |
| 2005/0038961 A1 | 2/2005 | Chen | |
| 2007/0124546 A1 | 5/2007 | Blanchard et al. | |

OTHER PUBLICATIONS

Herlihy, M., Moss, E., "Transactional Memory: Architectural Support for Lock-Free Data Structures", Proceedings of the Twentieth Annual International Symposium on Computer Architecture, 1993, pp. 1-12.

Rajwar, R., Herlihy, M., Lai, K., "Virtualizing Transactional Memory", ISCA '05: Proceedings of the 32nd Annual International Symposium on Computer Architecture, Washington, DC, IEEE Computer Society, 2005, pp. 494-505.

(Continued)

*Primary Examiner*—Matt Kim
*Assistant Examiner*—Ryan Dare
(74) *Attorney, Agent, or Firm*—Brooks Kushman P.C.

(57) ABSTRACT

The present disclosure describes a unique way for each of multiple processes to operate in parallel using (e.g., reading, modifying, and writing to) the same shared data without causing corruption to the shared data. For example, each of multiple processes utilizes current and past data values associated with a global counter or clock for purposes of determining whether any shared variables used to produce a respective transaction outcome were modified (by another process) when executing a respective transaction. If a respective process detects that shared data used by respective process was modified during a transaction, the process can abort and retry the transaction rather than cause data corruption by storing locally maintained results associated with the transaction to a globally shared data space.

18 Claims, 8 Drawing Sheets

OTHER PUBLICATIONS

Ananian, C.S., Asanovic, K., Kuszmaul, B.C., Leiserson, C.E., Lie, S., "Unbounded Transactional Memory", HPCA '05: Proceedings of the 11th International Symposium on High-Performance Computer Architecture, Washington, DC, IEEE Computer Society, 2005, pp. 316-327.

Hammond, L., Wong, V., Chen, M., Carlstrom, B.D., Davis, J.D., Hertzberg, B., Prabhu, M.K., Wijaya, H., Kozyrakis, C., Olukotun, K., "Transactional Memory Coherence and Consistency", ISCA '04: Proceedings of the 31st Annual International Symposium on Computer Architecture, Washington, DC, IEEE Computer Society, 2004.

Ennals, R., "Software Transactional Memory Should Not Be Obstruction-Free", www.cambridge,intel-research.net/rennals/notlockfree.pdf, 2005, pp. 1-10.

Fraser, K., Harris, T., "Concurrent Programming Without Locks", www.cl.cam.ac.uk/Research/SRG/netos/papers/2004-cpwl-submission.pdf, 2004, pp. 1-48.

Herlihy, M., "SXM: C# Software Transactional Memory", http://www.cs.brown.edu/~mph/SXM/README.doc, 2005.

Herlihy, M., Luchangco, V., Moir, M., Scherer III, W.N., "Software Transactional Memory for Dynamic-Sized Data Structure", Proceedings of the 22nd Annual ACM Symposium on Principles of Distributed Computing, 2003.

Marathe, V.J., Scherer III, W.N., Scott, M.L., "Design Tradeoffs in Modern Software Transactional Memory Systems", LCR '04: Proceedings of the 7th Workshop on Workshop on Languages, Compilers, and Run-Time Support for Scalable Systems, New York, NY, ACM Press, 2004.

Marathe, V.J., Scherer III, W.N., Scott, M.L., "Adaptive Software Transactional Memory", Proceedings of the 19th International Symposium on Distributed Computing, Cracow, Poland, 2005, pp. 354-368.

Moir, M., "Hybrid Transactional Memory", Technical Report Archivist 2004-0661, Sun Microsystems Research, 2004, pp. 1-15.

Saha, B., Adl-Tabatabai, A.R., Hudson, R.L., Minh, C.C., Hertzberg, B., "McRT-STM: A High Performance Software Transactional Memory System for a Multi-Core Runtime", PPoPP '06, Mar. 29-31, 2006, New York, NY, pp. 187-192.

Shalev, O., Shavit, N., "Predictive Log-Synchronization", EuroSys 2006, Apr. 18-21, 2006, Leuven, Belgium, pp. 305-315.

Shavit, N., Touitou, D., "Software transactional memory", Distributed Computing 10(2), 1997, p. 99-116.

Welc, A., Jagannathan, S., Hosking, A.L., "Transactional Monitors for Concurrent Objects", Proceedings of the European Conference on Object-Oriented Programming, vol. 3086 of Lecture Notes in Computer Science, Springer-Verlag, 2004, pp. 519-542.

Ananian, C.S., Rinard, M., "Efficient Object-Based Software Transactions", Proceedings of Synchronization and Concurrency in Object-Oriented Languages (SCOOL), ACM, 2005.

Kumar, S., Chu, M., Hughes, C.J., Kundu, P., Nguyen, A., "Hybrid Transactional Memory", PPoPP 2006, Mar. 29-31, 2006, New York, NY, pp. 209-220.

Harris, T., Fraser, K., "Language Support for Lightweight Transactions", SIGPLAN Not. 38(11), 2003, pp. 388-402.

Dice, D., Shavit, N., "What Really Makes Transactions Faster?", TRANSACT06 ACM Workshop, 2006.

Afek, Y., Attiya, H., Dolev, D., Gafni, E., Merritt, M., Shavit, N., "Atomic Snapshots of Shared Memory", J. ACM 40(4), 1993, pp. 873-890.

Agesen, O., Detlefs, D., Garthwaite, A., Knippel, R., Ramakrishna, Y.S., White, D., "An Efficient Meta-lock for Implementing Ubiquitous Synchronization", ACM SIGPLAN Notices 34(10), 1999, pp. 207-222.

Dice, D., "Implementing Fast Java Monitors with Relaxed-Locks", Proceedings of the Java Virtual Machine Research and Technology Symposium (JVM '01), Monterey, California, Apr. 23-24, 2001, pp. 79-90.

Bloom, B.H., "Space/Time Trade-offs in Hash Coding with Allowable Errors", Communications of the ACM, vol. 13, No. 7, Jul. 1970, pp. 422-426.

Boehm, H.J., "Space Efficient Conservative Garbage Collection", SIGPLAN Conference on Programming Language Design and Implementation, 1993, pp. 197-206.

Michael, M.M. "Hazard Pointers: Safe Memory Reclamation for Lock-Free Objects", IEEE Trans. on Parallel and Distributed Systems, vol. 15, No. 6, 2004, pp. 491-504.

Herlihy, M., Luchangco, V., Moir, M., "The Repeat Offender Problem: A Mechanism for Supporting Dynamic-Sized, Lock-Free Data Structures", Proceedings of the 16th International Symposium on Distributed Computing, vol. 2508, Springer-Verlag Heidelberg, 2002, pp. 339-353.

Hart, T.E., McKenney, P.E.., Brown, A.D., "Making Lockless Synchronization Fast: Performance Implications of Memory Reclamation", IEEE, 2006.

Fraser, K., "Practical lock-freedom", Technical Report, No. 579, University of Cambridge, Computer Laboratory, Feb. 2004, pp. 1-116.

Hanke, S., "The Performance of Concurrent Red-Black Tree Algorithms", Lecture Notes in Computer Science 1668, 1999, pp. 286-300.

Rajwar, R., Hill, M., "Transactional Memory Online", http://www.cs.wisc.edu/trans-memory, 2006.

Purcell, C., Harris, T, "Brief Announcement: Implementing Multi-Word Atomic Snapshots on Current Hardware", PODC'04, Jul. 25-28, 2004, St. Johns, Newfoundland, Canada.

Office Action issued in U.S. Appl. No. 11/475,262, dated Dec. 9, 2008.

Response to Office Action filed in U.S. Appl. No. 11/475,262, dated Apr. 7, 2009.

Office Action issued in U.S. Appl. No. 11/475,262, dated Jul. 8, 2009.

Chris Purcell et al., Brief Announcement; Implementing Multi-Word Atomic Snapshots on Current Hardware, Jul. 25-28, 2004, p. 1, PODC '04.

* cited by examiner

METHODS AND APPARATUS TO IMPLEMENT PARALLEL TRANSACTIONS

RELATED APPLICATIONS

This application claims the benefit of and priority to (i) U.S. Provisional Patent Application Ser. No. 60/789,483, filed on Apr. 5, 2006, entitled "Globally Versioned Transactional Locking," the entire teachings of which are incorporated herein by this reference, (ii) U.S. Provisional Patent Application Ser. No. 60/775,564, filed on Feb. 22, 2006, entitled "Switching Between Read-Write Locks and Transactional Locking," the entire teachings of which are incorporated herein by this reference, and (iii) U.S. Provisional Patent Application Ser. No. 60/775,580, filed on Feb. 22, 2006, entitled "Transactional Locking," the entire teachings of which are incorporated herein by this reference.

This application is related to U.S. patent application Ser. No. 11/475,604, filed on same date as the present application, entitled "METHODS AND APPARATUS TO IMPLEMENT PARALLEL TRANSACTIONS," which itself claims the benefit of and priority to U.S. Provisional Patent Application Ser. No. 60/775,564, filed on Feb. 22, 2006, entitled "Switching Between Read-Write Locks and Transactional Locking," the entire teachings of which are incorporated herein by this reference.

This application is related to U.S. patent application Ser. No. 11/475,716, filed on same date as the present application, entitled "METHODS AND APPARATUS TO IMPLEMENT PARALLEL TRANSACTIONS," which itself claims the benefit of and priority to U.S. Provisional Patent Application Ser. No. 60/775,580, filed on Feb. 22, 2006, entitled "Transactional Locking," the entire teachings of which are incorporated herein by this reference.

This application is related to U.S. patent application Ser. No. 11/475,262, filed on same date as the present application, entitled "METHODS AND APPARATUS TO IMPLEMENT PARALLEL TRANSACTIONS," which itself claims the benefit of and priority to U.S. Provisional Patent Application Ser. No. 60/775,564, filed on Feb. 22, 2006, entitled "Switching Between Read-Write Locks and Transactional Locking," the entire teachings of which are incorporated herein by this reference.

BACKGROUND

There has been an ongoing trend in the information technology industry to execute software programs more quickly. For example, there are various conventional advancements that provide for increased execution speed of software programs. One technique for increasing execution speed of a program is called parallelism. Parallelism is the practice of executing or performing multiple things simultaneously. Parallelism can be possible on multiple levels, from executing multiple instructions at the same time, to executing multiple threads at the same time, to executing multiple programs at the same time, and so on. Instruction Level Parallelism or ILP is parallelism at the lowest level and involves executing multiple instructions simultaneously. Processors that exploit ILP are typically called multiple-issue processors, meaning they can issue multiple instructions in a single clock cycle to the various functional units on the processor chip.

There are different types of conventional multiple-issue processors. One type of multiple-issue processor is a superscalar processor in which a sequential list of program instructions are dynamically scheduled. A respective processor determines which instructions can be executed on the same clock cycle, and sends them out to their respective functional units to be executed. This type of multi-issue processor is called an in-order-issue processor since issuance of instructions is performed in the same sequential order as the program sequence, but issued instructions may complete at different times (e.g., short instructions requiring fewer cycles may complete before longer ones requiring more cycles).

Another type of multi-issue processor is called a VLIW (Very Large Instruction Width) processor. A VLIW processor depends on a compiler to do all the work of instruction reordering and the processor executes the instructions that the compiler provides as fast as possible according to the compiler-determined order. Other types of multi-issue processors issue out of order instructions, meaning the instruction issue order is not be the same order as the order of instructions as they appear in the program.

Conventional techniques for executing instructions using ILP can utilize look-ahead techniques to find a larger amount of instructions that can execute in parallel within an instruction window. Looking-ahead often involves determining which instructions might depend upon others during execution for such things as shared variables, shared memory, interference conditions, and the like. When scheduling, a handler associated with the processor detects a group of instructions that do not interfere or depend on each other. The processor can then issue execution of these instructions in parallel thus conserving processor cycles and resulting in faster execution of the program.

One type of conventional parallel processing involves a use of coarse-grained locking. As its name suggests, coarse-grained locking prevents conflicting groups of code from operating on different processes at the same time based on use of lockouts. Accordingly, this technique enables non-conflicting transactions or sets of instructions to execute in parallel.

Another type of conventional parallel processing involves a use of fine-grain locking. As its name suggests, fine-grain locking prevents conflicting instructions from being simultaneously executed in parallel based on use of lockouts. This technique therefore enables non-conflicting instructions to execute in parallel.

SUMMARY

Conventional applications that support parallel processing can suffer from a number of deficiencies. For example, although easy to implement from the perspective of a software developer, coarse-grained locking techniques provide very poor performance because of limitations on parallelism. Although fine-grain lock-based concurrent software can perform exceptionally well during run-time, developing such code can be a very difficult task for a respective one or more software developers.

Techniques discussed herein deviate with respect to conventional applications such as those discussed above as well as other techniques known in the prior art. For example, embodiments herein include techniques for enhancing performance associated with transactions executing in parallel.

In general, a technique according to embodiments herein provides a unique way for each of multiple processes to operate in parallel using (e.g., based on reading, modifying, and writing to) the same shared data without causing corruption to the shared data. For example, each of multiple processes utilizes data values associated with a globally incremented variable or clock (as generated at various times) as a guideline or parameter for determining whether any dependent shared variables used to produce a respective transaction outcome were modified (by another process) when executing a respective transaction. If a respective process (executing a transaction to produce a respective transaction outcome) detects that another one or more process modifies globally shared data used by the respective transaction during a course of executing the respective transaction, the respective transaction must re-execute the transaction and abort further operations with respect to the transaction. If at commit time a respective process executing the transaction detects that there were no changes to dependent shared data used during execution of the transaction, the respective transaction can commit locally stored results in its respective "scratchpad" to the globally accessible set of shared data for use by other processes.

In view of the general embodiment discussed above, more specific embodiments herein are directed to maintaining version information associated with shared data. In one embodiment, a computer environment includes segments of information (e.g., a groupings, sections, portions, etc. of a repository for storing data values associated with one or more variables) that are shared by multiple processes executing in parallel. For each of at least two of the segments, the computer environment includes a corresponding location to store a respective version value (e.g., version information) representing a absolute version of a respective segment. A absolute version (e.g., version information) associated with a respective segment is changed or updated by a respective process (or monitor) each time any contents (e.g., data values of one or more respective shared variables) in a respective segment is modified. Accordingly, other processes keeping track of version information associated with a respective segment can identify if and when contents of the respective segment have been modified.

In furtherance of embodiments discussed above, a respective computer environment provides or maintains a globally accessible version information variable (e.g., a counter, self-incrementing clock, etc.) for providing absolute version information or time-stamp information indicating when respective (globally accessible shared data) has last been modified by a respective one of multiple processes executing in parallel. For example, version information is derived from a globally accessible version information variable such as a clock or counter that is incremented each time contents of shared data are modified. In other words, in one embodiment, a respective process updates version information associated with corresponding shared data to a current data value of the globally accessible version information variable each time the respective process modifies the respective portion of shared data. The processes utilize current data values generated by the globally accessible version information variable and previously stored version information associated with the different segments of shared data to identify whether a respective segment of shared data is modified during execution of a respective transaction.

Techniques herein are well suited for use in applications such as those supporting parallel processing and use of shared data based on one or more processes. However, it should be noted that configurations herein are not limited to such use and thus configurations herein and deviations thereof are well suited for use in other environments as well.

In addition to the embodiments discussed above, other embodiments herein include a computerized device (e.g., a host computer, workstation, etc.) configured to support the techniques disclosed herein such as use of a globally accessible version information variable supporting parallel execution of transaction performed by different processes. In such embodiments, a computer environment includes a memory system, a processor (e.g., a processing device), a respective display, and an interconnect connecting the processor and the memory system. The interconnect can also support communications with the respective display (e.g., display screen or display medium). The memory system can be encoded with an application that, when executed on a respective processor, supports parallel processing according to techniques herein.

Yet other embodiments of the present disclosure include software programs to perform the method embodiment and operations summarized above and disclosed in detail below in the Detailed Description section of this disclosure. More specifically, one embodiment herein includes a computer program product (e.g., a computer-readable medium). The computer program product includes computer program logic (e.g., software instructions) encoded thereon. Such computer instructions can be executed on a computerized device to support parallel processing according to embodiments herein. For example, the computer program logic, when executed on at least one processor associated with a computing system, causes the processor to perform the operations (e.g., the methods) indicated herein as embodiments of the present disclosure. Such arrangements as further disclosed herein can be provided as software, code and/or other data structures arranged or encoded on a computer readable medium such as an optical medium (e.g., CD-ROM), floppy or hard disk, or other medium such as firmware or microcode in one or more ROM or RAM or PROM chips or as an Application Specific Integrated Circuit (ASIC). The software or firmware or other such configurations can be installed on a computerized device to cause one or more processors in the computerized device to perform the techniques explained herein.

Yet another more particular technique of the present disclosure is directed to a computer program product or computer environment that includes a computer readable medium having instructions stored thereon to facilitate use of shared information among multiple processes. Based on use of the instructions and/or hardware associated with the computer environment, the computer environment: i) maintains a set of shared data utilized by multiple processes executing in parallel, ii) provides a globally accessible version information variable that changes over time, and iii) for each of at least two variables stored in the set of shared data, maintains a corresponding location to store a respective instantaneous data value associated with the globally accessible version information variable. Other embodiments of the present disclosure include hardware and/or software programs to perform any of the method embodiment steps and operations summarized above and disclosed in detail below.

It is to be understood that the system of the invention can be embodied as a software program, as software and hardware, and/or as hardware alone. Example embodiments of the invention may be implemented within computer systems, processors, and computer program products and/or software applications manufactured by Sun Microsystems Inc. of Palo Alto, Calif., USA.

BRIEF DESCRIPTION OF THE DRAWINGS

The foregoing and other objects, features, and advantages of the present application will be apparent from the following more particular description of preferred embodiments of the present disclosure, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

The present disclosure describes a unique way for each of multiple processes to operate in parallel using the same shared data without causing corruption to the shared data. For example, as will be discussed in this specification, each of multiple processes utilizes current and past data values associated with a global counter or clock for purposes of determining whether any shared variables used to produce a respective transaction outcome were modified (by another process) when executing a respective transaction. If a respective process detects that shared data used by a respective process was modified during a transaction, the process can abort and retry the transaction rather than cause data corruption by storing locally maintained results associated with the transaction to a globally shared data space.

Figure 1:
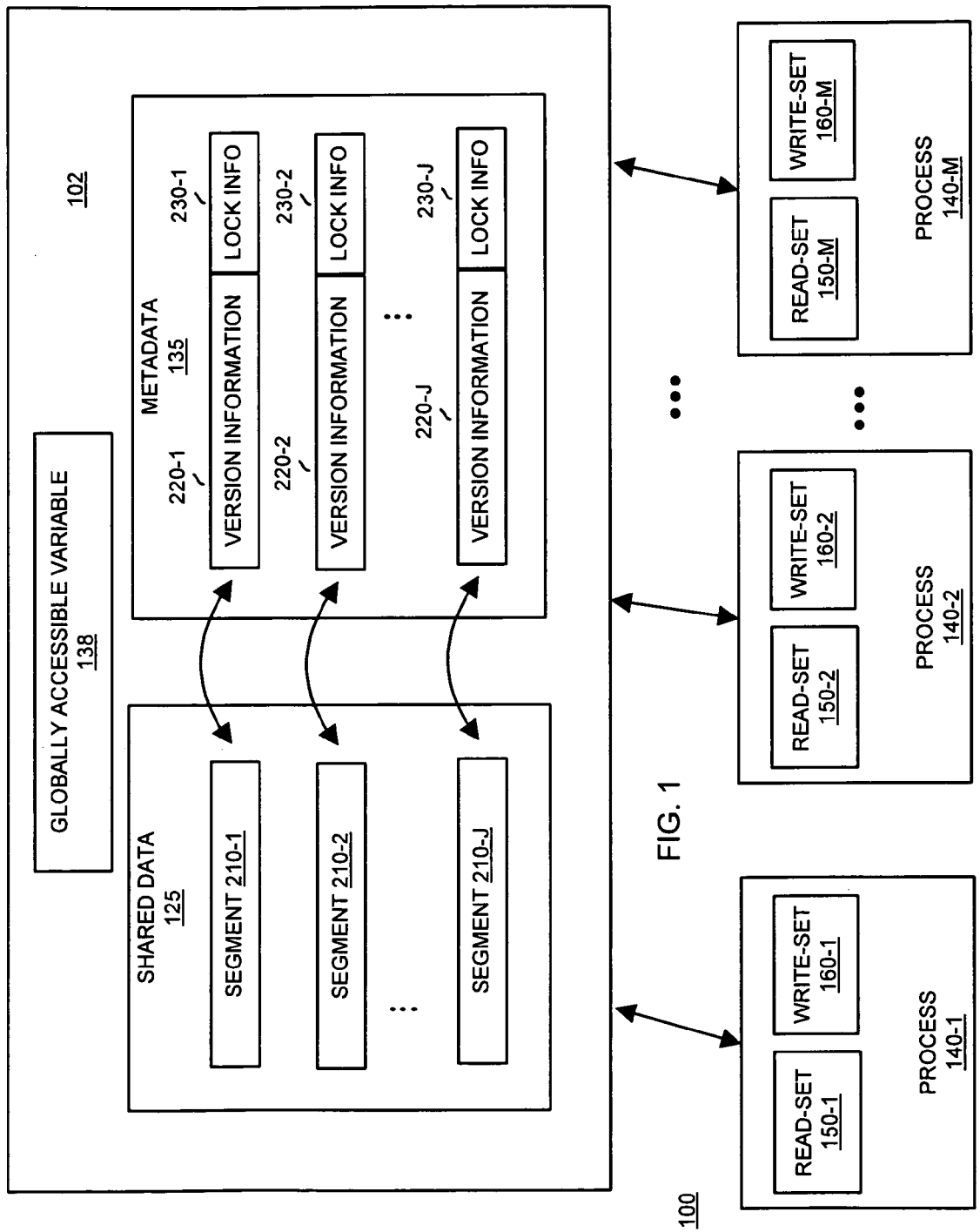
FIG. 1 is a diagram illustrating a computer environment enabling multiple processes to access shared data according to embodiments herein.

FIG. 1 is a block diagram of a computer environment 100 according to an embodiment herein. As shown, computer environment 100 includes shared data 125 and corresponding metadata 135 in global space 102 (e.g., a respective repository or global work environment) that is globally accessible by multiple processes 140 such as process 140-1, process 140-2, . . . process 140-M.

Metadata 135 enables each of processes 140 to identify whether portions (e.g., segments 210) of shared data 125 have been "locked" and whether any portions of shared data 125 have changed during execution of a respective transaction.

Each of processes 140 includes a respective read-set 150 and write-set 160 for storing information associated with shared data 125. The respective read-set and write-set are used to carry local computations with respect to a transaction. For example, process 140-1 includes read-set 150-1 and write-set 160-1 to carry out a respective one or more transactions associated with process 140-1. Process 140-2 includes read-set 150-2 and write-set 160-2 to carry out a respective transaction associated with process 140-2. Process 140-M includes read-set 150-M and write-set 160-M to carry out one or more transactions associated with process 140-M. Transactions can be defined by one or more instructions of software code.

Each of processes 140 can execute a respective set of instructions to carry out a respective transaction. In one embodiment, the transactions executed by the processes 140 are derived from the same overall program or application running on one or more computers.

In the context of a general embodiment herein such as computer environment 100 in which multiple processes 140 execute transactions in parallel, each of processes 140 accesses shared data 125 to generate computational results (e.g., transaction results) that are locally performed and eventually committed back for storage in a respective repository storing shared data 125. Shared data 125 is considered to be globally accessible because each of the multiple processes 140 can access the shared data 125.

Each of processes 140 can store data values locally that are not accessible by the other processes 140. For example, process 140-1 can globally access a data value and store a copy locally in write-set 160-1 that is not accessible by any of the other processes. In other words, one embodiment herein includes multiple processes 140, each of which includes its own privately accessible read-set 150 and write-set 160 for use as a local scratchpad prior to a committal phase.

During execution of a respective transaction, the process 140-1 is able to locally modify the data value in its write-set 160. Accordingly, one purpose of write-set 160 is to store globally accessed data that is modified locally.

As will be discussed later in this specification, the results of executing the respective transaction can be globally committed back to a respective repository (e.g., global space 102) storing shared data 125 depending on whether globally accessed data values, on which a respective transaction depends, happened to change during the course of the transaction executed by process 140-1. In general, a respective read-set 150-1 associated with each process stores information for determining which shared data 125 has been accessed during a respective transaction and whether any respective data values associated with globally accessed shared data 125 happens to change during execution of a respective transaction.

As shown, global space 102 includes shared data 125, metadata 135, and globally accessible version information variable 138 (e.g., a multi-bit counter, register, clock, etc.) according to embodiments herein. Shared data 125 can be partitioned to include segment 210-1, segment 210-2, . . . , segment 210-J. A respective segment of shared data 125 can be a resource such as a single variable, a set of variables, an object, a stripe, a portion of memory, etc. Metadata 135 includes respective version information 220 and lock information 230 associated with each corresponding segment 210 of shared data 125. In one embodiment, version information 220 is a multi-bit value that is updated to be a current value of the globally accessible version information variable 138 each time a respective process 140 modifies contents of a corresponding segment 210 of shared data 135. Thus, version information 220 provides a relative time when a corresponding segment or data therein has been modified based on the globally accessible version information variable 138.

The lock information 230 and version information 220 associated with a respective segment 210 can be up a single 64-bit word. In one embodiment, the lock information 230 is a single bit indicating whether or not a respective segment is locked by another process and the version information 220 is a 63-bit value that is updated to be a data value of the globally accessible version information variable 138 at the time of modification. Both the version information and lock information for a respective segment can be modified using a single store operation.

In one embodiment, the processes 140 are responsible for updating version information and lock information. In other embodiments, each of processes 140 need not be responsible for updating the version information 220. For example, a monitor function separate or integrated with processes 140 automatically initiate changing version information 220 each time contents of a respective segment is modified.

As an example of utilizing shared data 125 and metadata 135, assume that process 140-2 attempts to modify contents of segment 210-1 during a commit phase of a respective executed transaction. Prior to committing transaction results globally to shared data 125, process 140-2 (e.g., during execution of the transaction) would read and store version information 220-1 associated with segment 210-1 as contents of segment 210-1 were accessed by the transaction. After completion of a transaction and during the commit phase when transaction results are committed for storage in the global space 102, the process 140-2 modifies respective version information 220 in metadata 135 to a new value for each segment 210 modified during the commit phase. In one embodiment, if process 140-2 modifies contents of segment 210-1, then process 140-2 updates the version information 220-1 to a current value of the globally accessible version information variable 138 at or around "commit" time. As a specific example, prior to modifying segment 210-1, the version information 220-1 may have been a specific value such as 1306. After modifying segment 210-1, the process 140-2 updates the version information 220-1 to be a current value of globally accessible version information variable 138 such as a value of 1337 assuming that 1337 is the globally accessible version information variable 138 at a time of writing. Note that each time a respective process 140 updates any segment in shared data 125 with new data, the respective process increments a value of the globally accessible version information variable 138 by one. Each of the processes 140 performs a similar updating of corresponding version information 220 each time a respective process 140 modifies a respective segment 210 of shared data 125. Accordingly, the processes can monitor the version information 220 to identify when changes have been made to a respective segment 210 of shared data 125.

Note that metadata 135 also maintains lock information 230 associated with each respective segment 210 of shared data 125. In one embodiment, the lock information 230 associated with each segment 210 is a globally accessible single bit indicating whether one of processes 140 currently has "locked" a corresponding segment for purposes of modifying its contents. For example, a respective process such as process 140-1 can set the lock information 230-J to a logic one indicating that segment 210-J has been locked for use. Other processes know that contents of segment 210-J should not be accessed, used, modified, etc. during the lock phase initiated by process 140-1. Upon completing a respective modification to contents of segment 210-J, process 140-1 sets the lock information 230-J to a logic zero indicating the segment 210-J is free again. All processes 140 can then compete again to obtain a lock with respect to segment 210-J.

Figure 2:
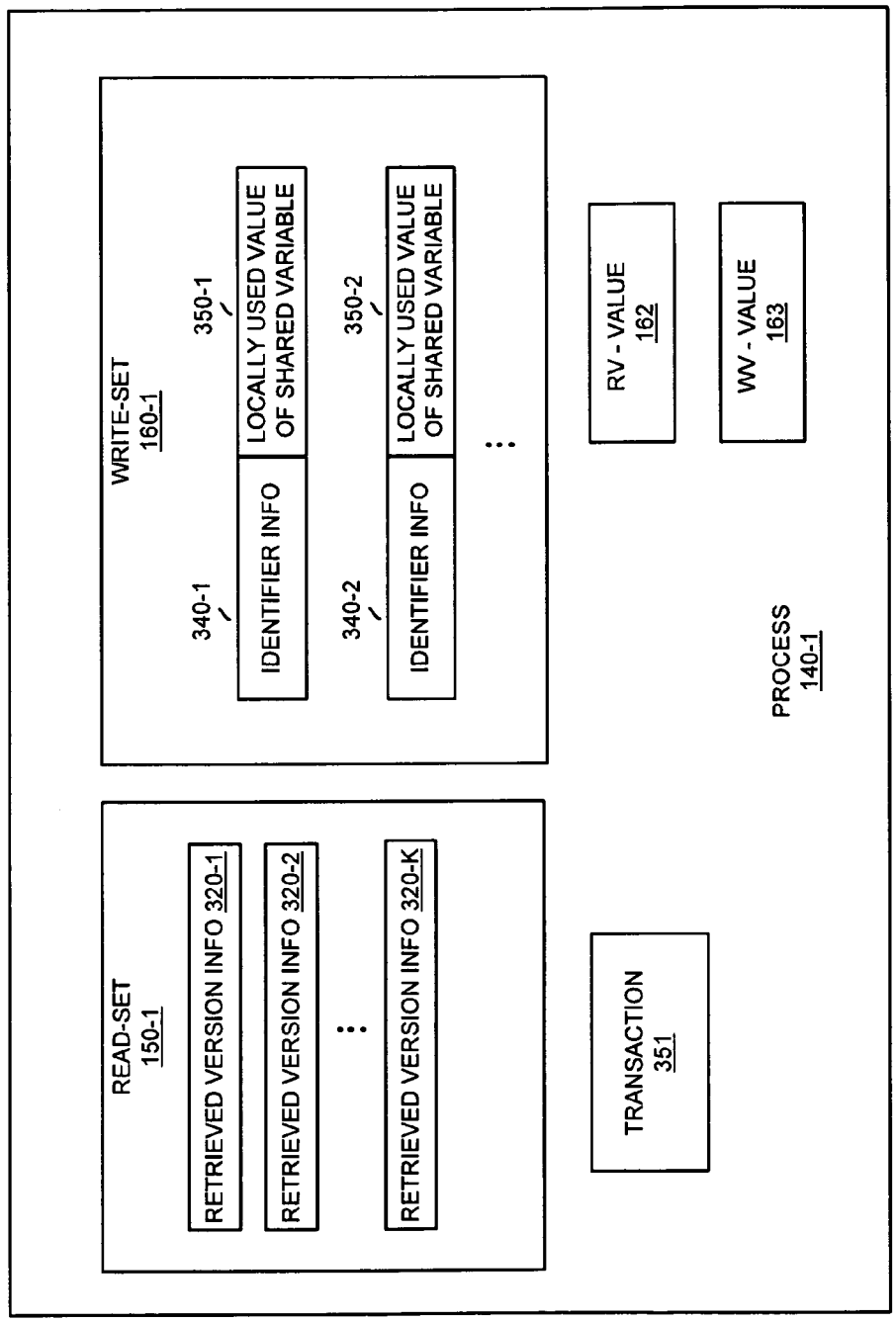
FIG. 2 is a diagram of a sample process including a read-set and write-set associated with a respective one of multiple processes according to embodiments herein.

FIG. 2 is a diagram more particularly illustrating details of respective read-sets 150 and write-sets 160 associated with processes 140 according to embodiments herein. As shown, process 140-1 executes transaction 351 (e.g., a set of software instructions). Read-set 150-1 stores retrieved version information 320-1, retrieved version information 320-2, . . . , retrieved version information 320-K associated with corresponding data values (or segments 210) accessed from shared data 125 during execution of transaction 351. Accordingly, the process 140-1 can keep track of version information associated with any globally accessed data.

Write-set 160-1 stores shared variable identifier information 340 (e.g., address information, variable identifier information, etc.) for each respective globally shared variable that is locally modified during execution of the transaction 351. Local modification involves maintaining and modifying locally used values of shared variables in write-set 160-1 rather than actually modifying the global variables during execution of transaction 351. As discussed above and as will be further discussed, the process 140-1 attempts to globally commit information in its write-set 160-1 to shared data 125 upon completion of transaction 351. In the context of the present example, process 140-1 maintains write-set 160-1 to include i) shared variable identifier information 340-1 (e.g., segment or variable identifier information) of a respective variable accessed from shared data 125 and corresponding locally used value of shared variable 350-1, ii) shared variable identifier information 340-2 (e.g., segment or variable identifier information) of a variable or segment accessed from shared data 125 and corresponding locally used value of shared variable 350-2, an so on. Accordingly, process 140-1 uses write-set 160-1 as a scratch-pad to carry out execution of transaction 351 and keep track of locally modified variables and corresponding identifier information.

In addition to a read-set 150 and write-set 160, each of multiple processes 140 maintains a respective RV-value 162 and WV-value 163. A respective process 140 sets its RV-value 162 equal to a data value of globally accessible version information variable 138 as read at the outset of a respective transaction 351. A respective process 140 sets WV-value 163 equal to a data value of globally accessible version information variable 138 as read during a commit phase of a respective transaction 351. More particular use of RV-value 162 and WV-value 163 will be discussed in the following figures.

Figure 3:
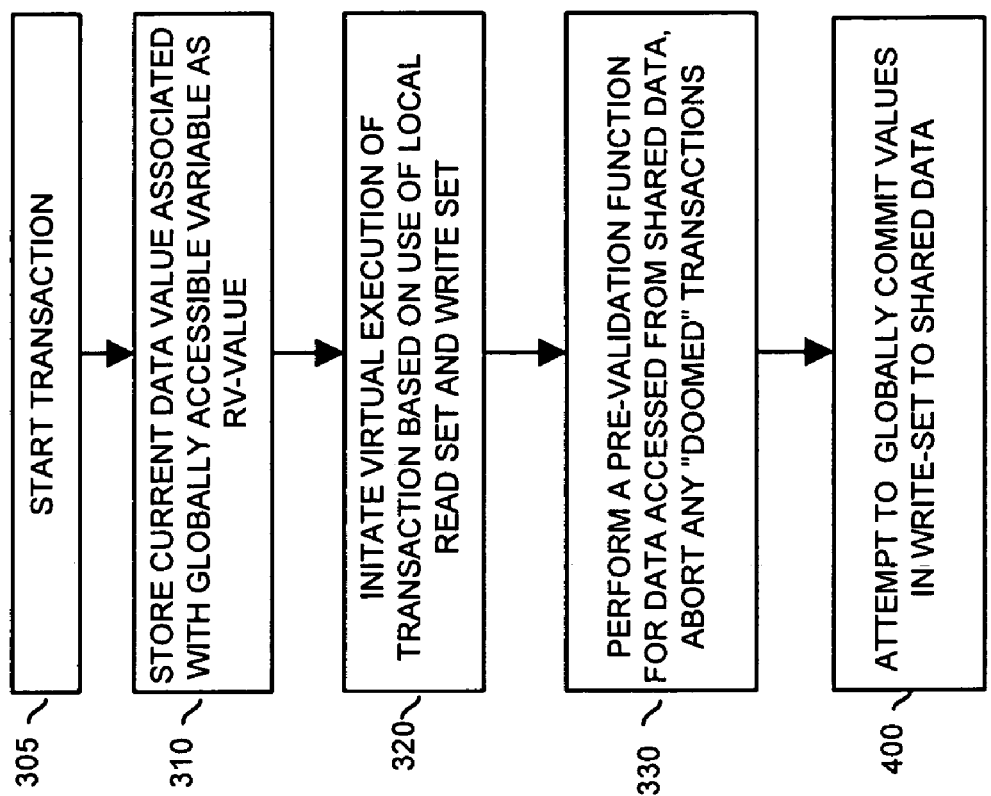
FIG. 3 is a diagram of a flowchart illustrating execution of a transaction according to an embodiment herein.

FIG. 3 is a flowchart 300 illustrating a more specific use of read-sets 150, write-sets 160, version information 220, and lock information 230, globally accessible version information variable 138, RV-value 162, and WV-value 163 according to embodiments herein.

Step 305 indicates a start of a respective transaction associated with a process 140. As previously discussed, a transaction 351 can involve execution of a set of software instructions indicating how to carry out one or more computations at least partially using shared data 125.

In step 310, a respective process 140 stores a current data value associated with globally accessible version information variable 138 and stores it as RV-value 162. In other words, the respective process samples a global version number of globally accessible version information variable 138 and loads the current value of the globally accessible version information variable 138 (e.g., global version number) in a local variable called the RV-value 162. RV-value 162 is used at a later time for detection of recent changes to shared data 125 based on comparing the RV-value to version information 220.

In step 320, the respective process initiates virtual execution of the transaction based on use of its read-set 150 and write-set 160. For example, the respective process executes the transaction code associated with a respective transaction 351. In one embodiment, load and store instructions in the transaction 351 are modified (e.g., augmented and replaced) so that a transaction's operations are performed locally in read-set 150 and write-set 160 without modifying shared data 125 until a commit phase. This "local" logging functionality can be implemented by simply augmenting load instructions with corresponding instructions that record read accesses and replaces stores with code recording the address and value to-be written.

In one embodiment, during a load transaction (e.g., read from shared data 125), a respective process checks whether the corresponding load address associated with the load transaction already appears in its respective write-set 160. If so, the transactional load returns the last value (as stored in the write-set 160) written to the address in the write-set 160 rather than fetching the data value of the variable from shared data 125. If not, the process retrieves the variable from shared data 125. This technique provides an illusion of processor consistency and avoids so-called read-after-write hazards.

In step 330, the process executing the respective transaction accesses any variables from shared data 125 that have not been locally stored in write-set 160. Global access of data from the shared data 125 further involves execution of a set of post-validation code that checks version information 220 and lock information 230. For example, the process checks that a version associated with an accessed portion of a respective segment has not changed and that the segment is free from locks. Also, the process verifies that the version information associated with the segment being accessed has a respective value less than or equal to RV-value 162. If the respective value is greater than RV-value 162, this indicates that the respective memory location in shared data 125 associated with the variables being accessed has been modified since starting the respective transaction. In such circumstances, the process aborts the transaction. This prevents so-called "doomed" transactions from needlessly executing because it is known up front that "relied upon" shared data 125 associated with a respective transaction has been modified by another process. Otherwise, processing continues in step 400.

In step 400, the respective process attempts to globally commit values in its write-set 160 to shared data 125. This is further described in the following figure.

Figure 4:
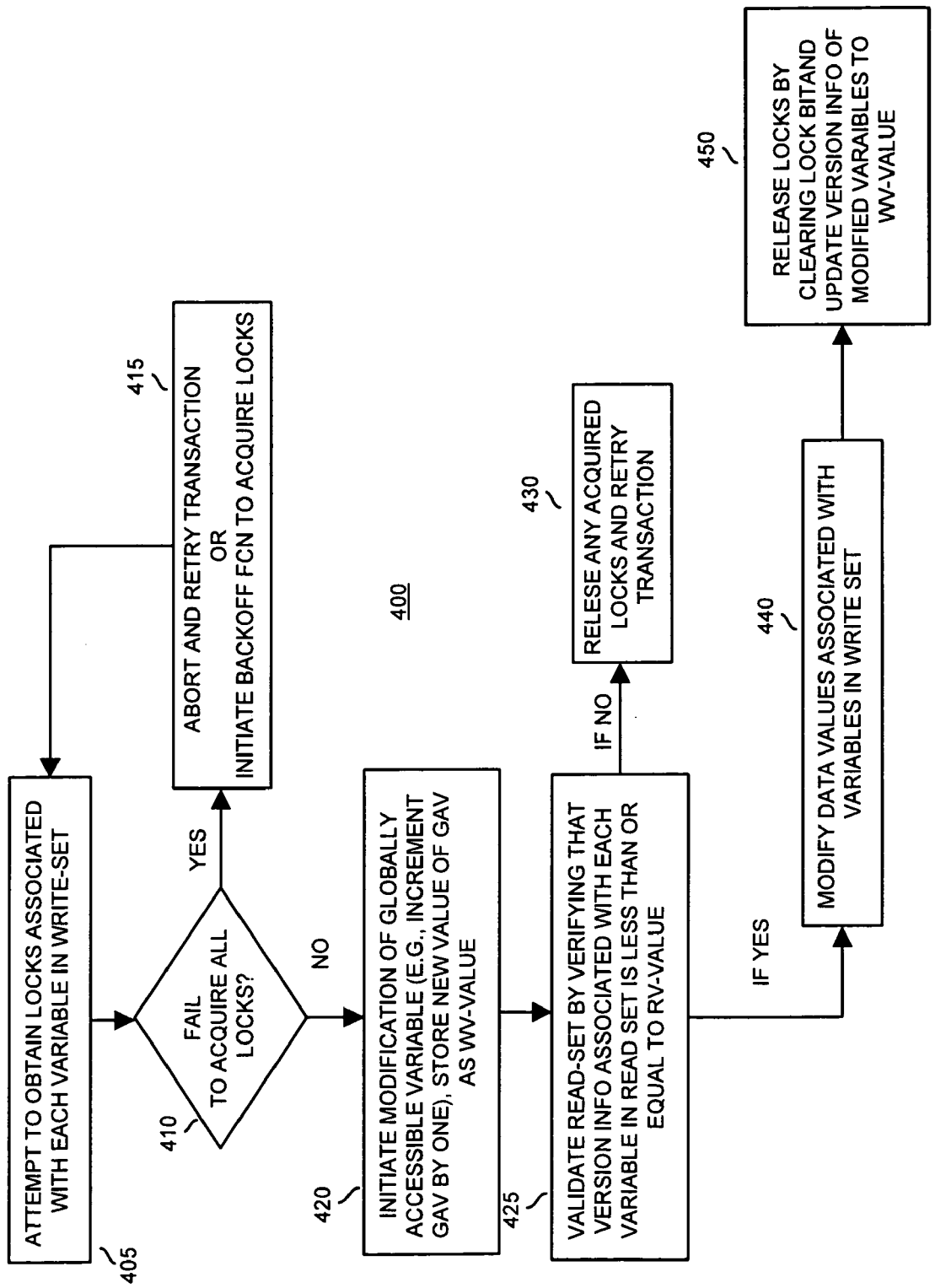
FIG. 4 is a diagram of a flowchart illustrating execution of a transaction according to embodiments herein.

FIG. 4 is a flowchart 400 illustrating a technique for committing results of a transaction to shared data 125 according to embodiments herein. Up until his point, the process executing the respective transaction has not initiated any locks on any shared data yet although the process does initiate execution of local computations associated with shared data 125 accessed from global space 102.

In step 405, the respective process that executed the transaction attempts to obtain locks associated with each variable in its write-set 160. For example, the process checks whether lock information in metadata 135 indicates whether the variables (e.g., corresponding segments 210) to be written to (e.g., specific portions of globally accessible shared data 125) are locked by any other processes. The process initiates locking the variables (or segments as the case may be) to block other process from using or locking the variables. In one embodiment, the respective process acquires the locks in any convenient order using bounded spinning to avoid indefinite dead-lock.

In case not all of these locks are successfully acquired in step 410, the transaction fails as indicated in step 415. For example, in one embodiment, if all locks cannot be immediately obtained in step 410, then the process can abort and retry a transaction or initiate a back-off function to acquire locks associated with the variables that are locally modified during execution of the transaction.

After all appropriate locks have been obtained in step 405 by writing respective lock information 230 to all variables that will be modified, processing continues at step 420. In step 420, the respective process initiates modification of globally accessible version information variable 138. For example, in one embodiment, the process increments the globally accessible version information variable 138 by one and stores a copy of the data value associated with the new globally accessible version information variable 138 as WV-value 163.

In one embodiment, upon successful completion of lock acquisition of all locks in the write-set, the process performs an increment-and-fetch (e.g., using a CAS operation) of the globally accessible version information variable recording the returned value in a local write-version number variable WV-value 163.

In step 425, the process validates its respective read-set 150 by verifying that version information associated with each variable identified in the read-set 150 is less than or equal to RV-value 163. For example, the process verifies that each accessed variable (e.g., location) as identified in the read-set 150 has a respective version number that is less than or equal to RV-value 162. The process also verifies that memory locations in shared data 125 associated with the accessed variables have not been locked by other threads. If this verification fails, then the respective transaction is aborted as indicated in step 430.

By re-validating the read-set 150 at the commit phase, the process can be assured that respective memory locations in shared data 125 have not been modified during execution of the respective transaction. In the special case where RV-value+1=WV-value, then it is not necessary to validate the respective read set 150 because it is guaranteed that no concurrently executing transaction modified such locations of shared data 125.

In step 440, the respective process executing a transaction modifies data values associated with the variables in its write-set 160. This involves storing data values associated with locally modified variables to shared data 125. Accordingly, other processes 140 can use the results associated with the committed transaction.

In step 450, the process releases locks by clearing lock bits and updates version information of any modified variables to equal WV-value 163. This can be done using a simple store instruction. For example, for each location in the write-set 160, the process can store a new data value to the appropriate location in shared data. Also, the process can simultaneously update respective version information associated with a modified segment as well as release a respective lock based on a single store instruction.

Figure 5:
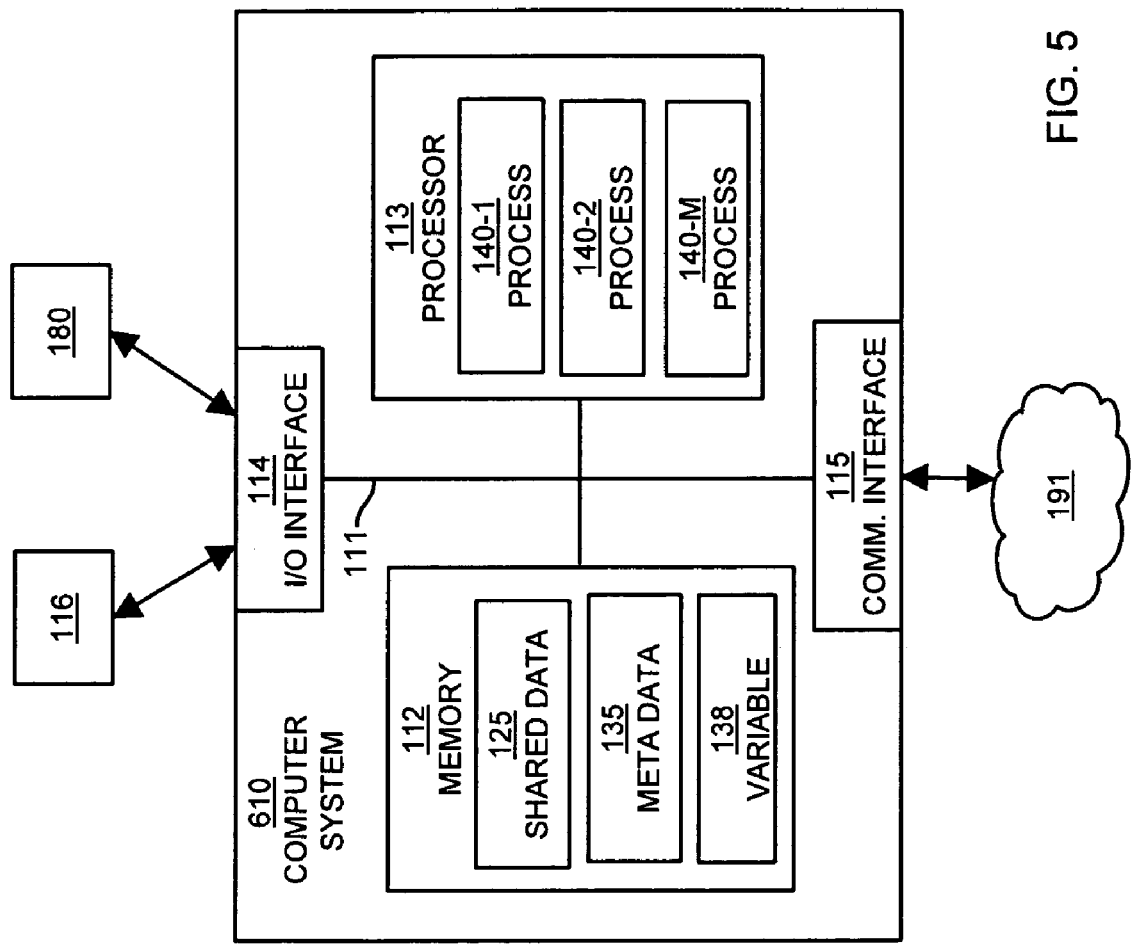
FIG. 5 is a diagram of a sample architecture supporting shared use of data according to embodiments herein.

FIG. 5 is a block diagram illustrating an example computer system 610 (e.g., an architecture associated with computer environment 100) for executing parallel processes 140 and other related processes according to embodiments herein. Computer system 610 can be a computerized device such as a personal computer, workstation, portable computing device, console, network terminal, processing device, etc.

As shown, computer system 610 of the present example includes an interconnect 111 that couples a memory system 112 storing shared data 125, globally accessible version information variable 138, and metadata 135, one or more processors 113 executing processes 140, an I/O interface 114, and a communications interface 115. Peripheral devices 116 (e.g., one or more optional user controlled devices such as a keyboard, mouse, display screens, etc.) can couple to processor 113 through I/O interface 114. I/O interface 114 also enables computer system 610 to access repository 180 (that also potentially stores shared data 125 and/or metadata 135). Communications interface 115 enables computer system 610 to communicate over network 191 to transmit and receive information from different remote resources.

Note that functionality associated with processes 140 and/or computer environment 100 can be embodied as software code such as data and/or logic instructions (e.g., code stored in the memory or on another computer readable medium such as a disk) that support functionality according to different embodiments described herein. Alternatively, the functionality associated with processes 140 can be implemented via hardware or a combination of hardware and software code. Processor 113 can be one or multiple processors executing multiple threads.

It should be noted that, in addition to the processes 140 themselves, embodiments herein include a respective application and/or set of instructions to carry out processes 140. Such a set of instructions associated with processes 140 can be stored on a computer readable medium such as a floppy disk, hard disk, optical medium, etc. The set of instruction can also be stored in a memory type system such as in firmware, RAM (Random Access Memory), read only memory (ROM), etc. or, as in this example, as executable code.

Collective attributes associated with processes 140, global space 102, and computer environment 100, etc. will now be discussed with respect to flowcharts in FIGS. 6-8. For purposes of this discussion, global space 102 and/or computer environment 100 can execute or carry out the steps described in the respective flowcharts. Note that the steps in the below flowcharts need not always be executed in the order shown.

Figure 6:
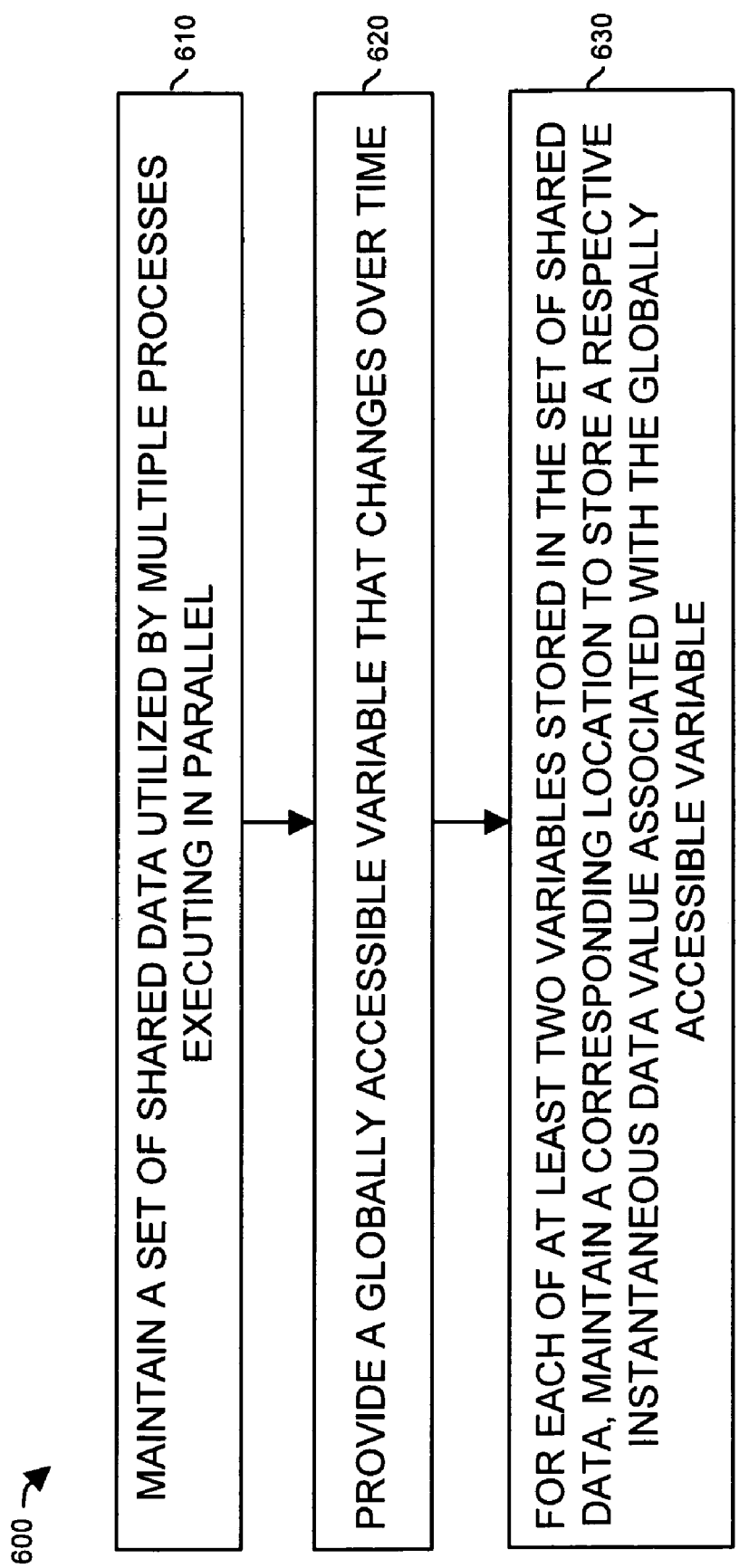
FIG. 6 is a diagram of a flowchart illustrating a technique supporting simultaneous execution of multiple processing threads according to an embodiment herein.

Now, more particularly, FIG. 6 is a flowchart 600 illustrating a technique supporting execution of parallel transactions in computer environment 100 according to an embodiment herein. Note that techniques discussed in flowchart 600 overlap and summarize some of the techniques discussed above.

In step 610, the computer environment 100 maintains a set of shared data 125 utilized by multiple processes 140 executing in parallel.

In step 620, the computer environment 100 provides a globally accessible version information variable 138 that changes over time.

In step 630, for each of at least two variables (or segments) stored in the set of shared data 125, the computer environment 100 maintains a corresponding location (e.g., version information 220) to store a respective instantaneous data value associated with the globally accessible version information variable 138.

Figure 7:
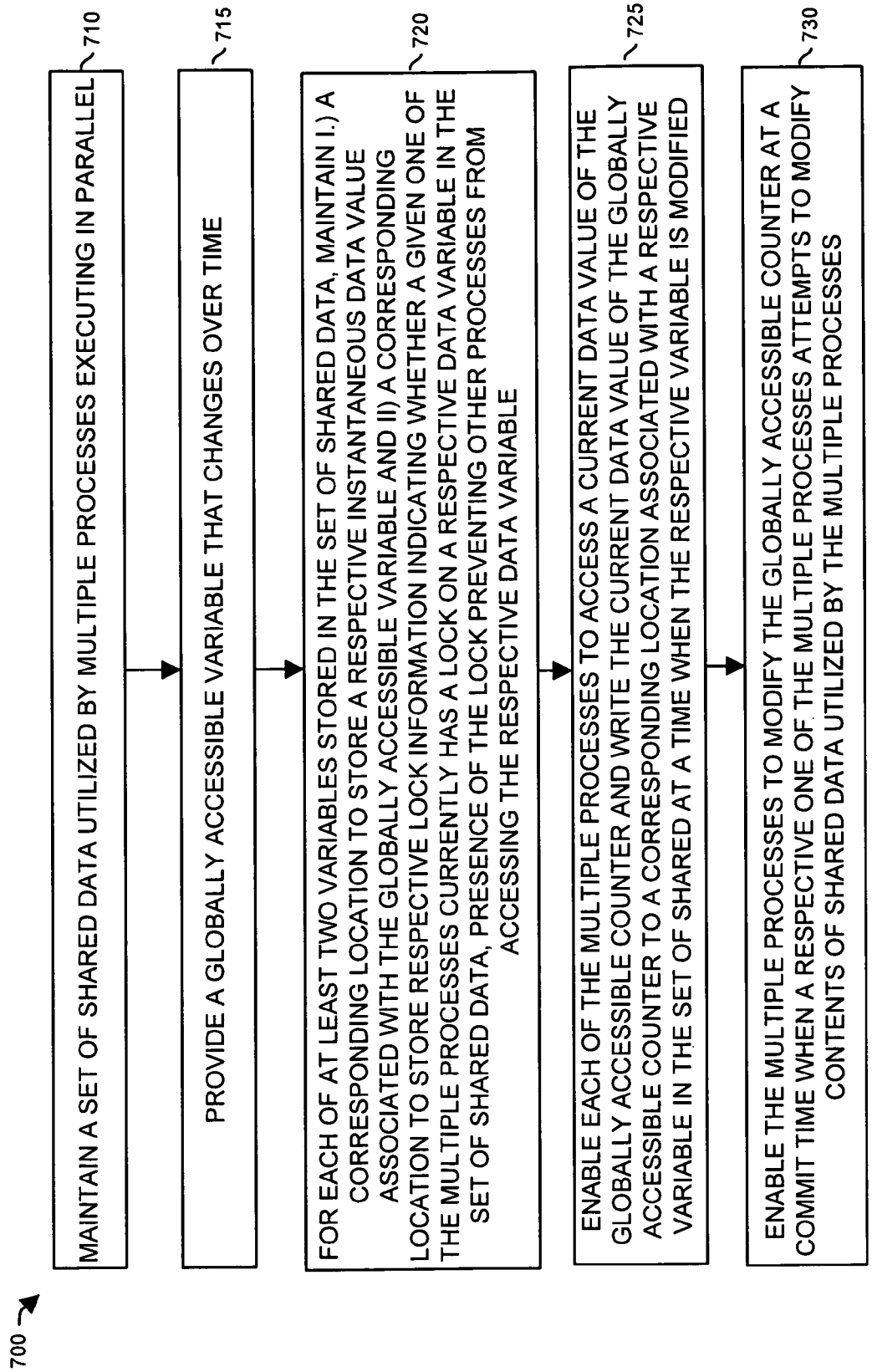
FIG. 7 is a diagram of a flowchart illustrating a technique supporting simultaneous execution of multiple processing threads according to an embodiment herein.

FIG. 7 is a flowchart 700 illustrating a technique supporting parallel execution of processes according to embodiments herein. Note that techniques discussed in flowchart 800 overlap with the techniques discussed above in the previous figures.

In step 710, the global space 102 of computer environment 100 maintains a set of shared data 125 utilized by multiple processes 140 executing in parallel.

In step 715, the global space 102 of computer environment 100 maintains a globally accessible version information variable 138 that changes over time.

In step 720, for each of at least two variables stored in the set of shared data, the global space 102 maintains i.) a corresponding location (e.g., version information in metadata 135) to store a respective instantaneous data value associated with the globally accessible version information variable 138 and ii) a corresponding location (e.g., lock information 230 in metadata 135) to store respective lock information indicating whether a given one of the multiple processes 140 currently has a lock on a respective data variable in the set of shared data 125. Presence of a lock prevents other processes 140 from accessing a respective segment 210 or data variable therein.

In step 725, the global space 102 enables each of the multiple processes 140 to access a current data value of the globally accessible counter 138 and write the current data value of the globally accessible counter 139 to a corresponding location associated with a respective variable in the set of shared data 125 at a time when the respective variable in the shared data 125 is modified.

In step 730, the global space 102 enables the multiple processes 140 to modify the globally accessible version information variable 138 at a commit time when the respective one of multiple processes 140 attempts to modify contents of shared data 125 utilized by the multiple processes 140.

Figure 8:
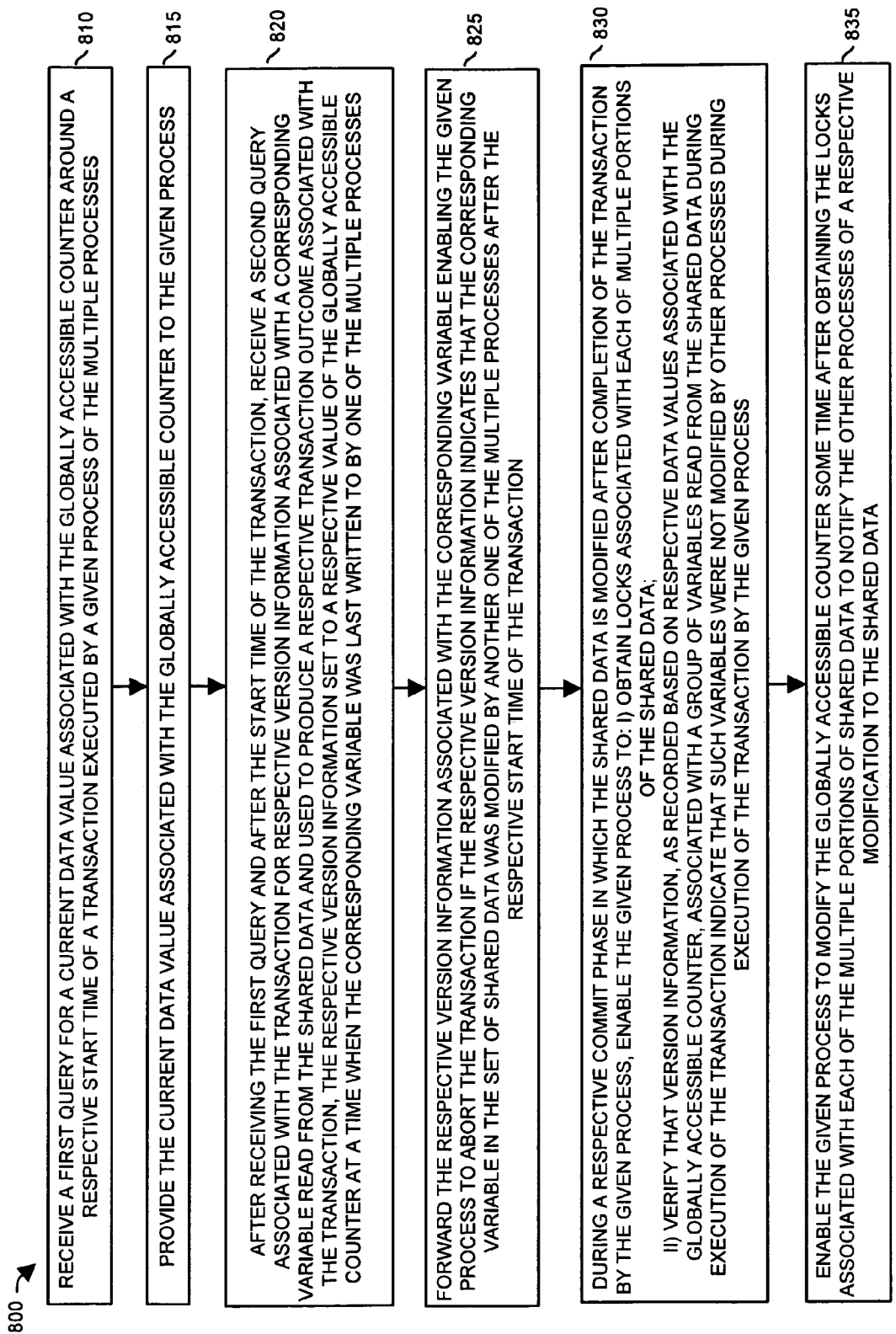
FIG. 8 is a diagram of a flowchart illustrating a technique supporting simultaneous execution of multiple processing threads according to an embodiment herein.

FIG. 8 is a flowchart 800 illustrating another technique associated with use of globally accessible version information variable 138 according to embodiments herein. Note that techniques discussed in flowchart 800 overlap and summarize some of the techniques discussed above.

In step 810, the global space 102 receives a first query for a current data value associated with the globally accessible version information variable 138 around a respective start time of a transaction executed by a given process of the multiple processes 140.

In step 815, the global space 102 provides the current data value associated with the globally accessible version information variable 138 to the given process.

In step 820, after receiving the first query and after the start time of the respective transaction, the global space 102 receives a second query associated with the transaction for respective version information 220 associated with a corresponding variable read from the shared data 125, which is used to produce a respective transaction outcome associated with the transaction. The respective version information associated with the corresponding variable read from the shared data 126 reflects a respective value of the globally accessible version information variable 138 at a time when the corresponding variable 138 was last written to by one of the multiple processes 140.

In step 825, the global space 102 forwards (e.g., provides) the respective version information associated with the corresponding variable enabling the given process to abort the transaction if the respective version information indicates that the corresponding variable in the set of shared data 125 was modified by another one of the multiple processes 140 after the respective start time of the transaction.

In step 830, during a respective commit phase in which the shared data 125 is modified after completion of the transaction by the given process, the global space 102 enable the given process to:

i) obtain locks associated with each of multiple portions of the shared data 125;

ii) verify that version information, as recorded based on respective data values associated with the globally accessible version information variable 138, associated with a group of variables read from the shared data 125 during execution of the transaction indicate that such variables were not modified by other processes during execution of the transaction by the given process.

In step 835, the global space 102 enables the given process to modify the globally accessible version information variable 138 some time after obtaining the locks associated with each of the multiple portions of shared data 125 to notify the other processes 140 of a respective modification to the shared data 125.

As discussed above, techniques herein are well suited for use in applications such as those that support parallel processing threads in the same processor or in different processors. However, it should be noted that configurations herein are not limited to such use and thus configurations herein and deviations thereof are well suited for use in other environments as well.

For example, as discussed above, this disclosure introduces a so-called transactional locking II (TL2) algorithm. Improving on all former lock-based STMs, embodiments herein use a novel global versioning technique to (1) always operate on a consistent memory state, eliminating safety problems and the need for safety tests embedded in user code as in other STMs, and (2) eliminate the need for constructing and validating a read-set in read-only transactions, dramatically improving their performance. In a way, it reduces the problem of providing an efficient STM to the problem of providing (in software or hardware) an efficient low overhead coherent global version counter or "clock." Unlike any former STM algorithms, TL2 fits seamlessly with any system's memory life-cycle, including those using malloc/free.

1.1 Further Details associated with Transactional Programming

The transactional memory programming paradigm is gaining momentum as the approach of choice for replacing locks in concurrent programming. Combining sequences of concurrent operations into atomic transactions seems to promise a great reduction in the complexity of both programming and verification, by making parts of the code appear to be sequential without the need to program finegrained locks. Transactions will hopefully remove from the programmer the burden of figuring out the interaction among concurrent operations that happen to conflict with each other. Non-conflicting Transactions will run uninterrupted in parallel, and those that do will be aborted and retried without the programmer having to worry about issues such as deadlock. There are currently proposals for hardware implementations of transactional memory (e.g., HTM), 29], purely software based ones, i.e. software transactional memories (STM), and hybrid schemes (HyTM) that combine hardware and software.

A dominant trend among transactional memory designs seems to be that the transactions provided to the programmer, in either hardware or software, should be "large scale", that is, unbounded, and dynamic. Unbounded means that there is no limit on the number of locations accessed by the transaction. Dynamic (as opposed to static) means that the set of locations accessed by the transaction is not known in advance and is determined during its execution. Providing large scale transactions in hardware tends to introduce large degrees of complexity into the design. Providing them efficiently in software is a difficult task, and there seem to be numerous design parameters and approaches in the literature as well as requirements to combine well with hardware transactions once those become available.

1.1 Software Transactional Memory

The use of inconsistent states in conventional algorithm is problematic as it violates safety. Lets define a "zombie" transaction as a transaction that has observed an inconsistent read-set but has yet to abort. This disclosure is concerned with the actions performed by zombies, such as looping indefinitely, generating traps, etc. Certain conventional techniques detect traps with a signal handlers and then longjmp( )s to restart the offending txn. The techniques attempt to detect infinite loops by having every nth transactional open validate part of the accumulated read-set. This policy admits infinite loops, as it is possible for a transaction to read less than n memory locations, which may theoretically be inconsistent and cause the thread to enter an non-transactional infinite loop.

This paper introduces the transactional locking II (TL2) algorithm. TL2 overcomes all of the drawbacks of all state-of-the-art lock-based algorithms. As discussed above, it can be used as a commit time locking scheme together with a novel global versioning technique to (1) operate on a consistent memory state, eliminating the need for safety tests embedded in user code as in other STMs and (2) eliminate the overheads associated of constructing and validating a read-set in read-only transactions.

1.3 TL2 in a Nutshell

One aspect of the present disclosures is use of a global version counter (e.g., globally accessible version information variable 138 as discussed above in FIGS. 1-8) that is incremented or modified by each transaction that writes to memory, and is read by all transactions. For all but the shortest transactions, the effects of contention on this counter are minimal. All memory locations are appended with a lock that includes a respective version number. Transactions start by reading the global version counter and validating every newly read location against this counter. As discussed, this allows an computer environment to guarantee at a very low cost that only consistent memory views are ever read. Writing transactions need to collect a read-set but read-only ones do not. Once read and write sets are collected, the transaction acquires locks on locations to be written, increments the global version counter, and eventually attempts to commit by validating the readset. Once committed, a respective transaction updates the memory locations and releases the locks, writing into them its global version number.

The current disclosure overcomes most of the safety and performance issues that have dogged high performance lock-based STM implementations:

Unlike any former STM, techniques herein can deliver performance comparable to that of hand crafted data structures across the concurrency spectrum.

Unlike any former lock-based STMs, techniques herein do not suffer from safety issues related to reading inconsistent memory states. Also, former lock-based STMs must use compiler assist or manual programmer intervention to perform validity tests in user code to try and avoid as many of these unsafe behaviors as possible. This safety issue will be a major factor when going from experimental algorithms to actual production quality STMs.

Unlike any former STM (including ones that seem to claim they can work with any malloc/free style memory allocation), techniques herein allow transactional memory to be recycled into non-transactional memory and back using malloc and free style operations. This is done seamlessly and with no added complexity.

TL2 can be transformed into a highly efficient static transactional memory implementation (for example an NCAS) that requires only a single access to each location written or read, and no read or set, improving n former conventional implementations.

Thus, the present disclosure describes various embodiments that deliver safety, interoperability, and performance comparable to that of hand crafted data structures, making them ready for commercial deployment today.

2. Transactional Locking II

As explained in this specification, based on this global versioning approach, as opposed to prior localized versioning approaches, embodiments herein eliminate several key safety issues afflicting other lock-based STM systems and simplify the process of mechanical code transformation. In addition, the use of global versioning as discussed herein can be used to improve the performance of read-only transactions.

For example, the two-phase locking scheme herein operates in commit time lock acquisition mode and further includes an encounter time algorithm to prevent execution of "doomed" transactions (e.g., zombies).

For each implemented transactional system (i.e. per application or data structure), techniques herein includes use of a shared global version number variable. According to one implementation, a globally accessible version information variable 138 is incremented using an increment-and-fetch implemented with a compare-and-swap (CAS) operation. There are alternative implementations that offer improved performance as will be discussed below. In one embodiment, the global version number will be read and incremented by each writing transaction and will be read by every read-only transaction.

Each special versioned write-lock has an associated transacted memory location. In its simplest form, the versioned write-lock is a spinlock that uses a CAS operation to acquire the lock and a store to release it. Since one only needs a single bit to indicate that the lock is taken, we use the rest of the lock word to hold a version number. This number is incremented by every successful lock-release. A new value written in each location will be based on the shared global version number variable at a time of writing, a property which will provide us with several performance and correctness benefits.

To implement a given data structure we allocate a collection of versioned write-locks. We can use various schemes for associating locks with shared data: per object (PO), where a lock is assigned per shared object, or per stripe (PS), where we allocate a separate large array of locks and memory is stripped (divided up) using some hash function to map each location to a stripe. Other mappings between transactional shared variables and locks are possible. The PO scheme requires either manual or compiler-assisted automatic put of lock fields whereas PS can be used with unmodified data structures. PO might be implemented, for instance, by leveraging the header words of Java™ objects. A single PS stripe-lock array may be shared and used for different TL2 data structures within a single address-space. For instance an application with two distinct TL2 red-black trees and three TL2 hash-tables could use a single PS array for all TL2 locks. As our default mapping we chose an array of $2^{20}$ entries of 32-bit lock words with the mapping function masking the variable address with "0xFFFFC" and then adding in the base address of the lock array to derive the lock address.

In the following discussion, we describe the PS version of the TL2 algorithm although most of the details carry through verbatim for PO as well. We maintain thread local read- and write-sets as linked lists. The read-set entries contain the address of the lock (and unlike former algorithms does not need to contain the observed version number of the lock. The write-set entries contain the address of the variable, the value to be written to the variable, and the address of the lock that "covers" the variable (in many cases the lock and location address are related and so we need to keep only one of them in the read set. The write-set is kept in chronological order to avoid write-after-write hazards.

2.1 The Basic TL2 Algorithm

We now describe how TL2 executes in commit mode a sequential code fragment that was placed within a TL2 transaction. As we explain, TL2 does not require safe loads, traps, or the insertion of validation tests within user code, and in this mode does not require type-stable garbage collection, working seamlessly with the memory life-cycle of languages like C and C++.

2.1.1 Write Transactions

The following sequence of operations is performed by a writing transaction, one that performs writes to the shared memory. We will assume that a transaction is a writing transaction. If it is a read-only transaction this can be denoted by the programmer, determined at compile time, or heuristically at runtime, as we elaborate later.

1. Sample global version number: Load the current value of the global version number and store it in a local variable called the read-version number (rv). This value is later used for detection of recent changes to data fields by comparing it to the version fields of their versioned write-locks.

2. Run through a virtual execution: Execute the transaction code (load and store instructions are mechanically augmented and replaced so that virtual execution does not change the shared memory's state, hence the term "virtual"). Locally maintain a read set of addresses loaded and a write set address/value pairs stored (This logging functionality is simply implemented by augmenting loads with instructions that record the read address and replacing stores with code recording the address and value to-be-written).

The transactional load first checks (using a filter) to see if the load address already appears in the write-set. If so the transactional load returns the last value written to the address. This provides the illusion of processor consistency and avoids so-called read-after-write hazards.

A new load instruction sampling the associated lock is inserted before each original load, which is then followed by post-validation code checking that the location's versioned write-lock is free and has not changed. Additionally, we make sure that the lock's version field is $\leq$rv. If it is greater than rv it suggests that the memory location has been modified after the current thread performed step 1, and the transaction is aborted.

3. Lock write set: Acquire the locks in any convenient order using bounded spinning to avoid indefinite deadlock. In case not all of these locks are successfully acquired, the transaction fails.

4. Increment Global Version Number: Upon successful completion of lock acquisition of all locks in the write-set perform an increment-and-fetch (using a CAS operation for example) of the global version number recording the returned value in a local write version number variable wv.

5. Validate the read set: Validate for each location in the read-set that its version number is $\leq$rv. We also verify that these memory locations have not been locked by other threads. In case the validation fails, the transaction is aborted. By re-validating the read-set, we guarantee that its memory locations have not been modified while steps 3 and 4 were being executed. In the special case where rv+1=wv it is not necessary to validate the read set, as it is guaranteed that no concurrently executing transaction could have modified it.

6. Commit and release the locks: For each location in the write-set, store to the location the new value from the write-set and release the locations lock by setting the version value to the write-version wv and clearing the write-lock bit (this can be done using a simple store).

A few things to note: The write-locks have been held for a brief time when attempting to commit the transaction. This helps improve performance under high contention. The filter allows us to determine if a value is not in the write set and need not be searched for by reading the single filter word. Though locks could have been acquired in ascending address order to avoid deadlock, we found that sorting the addresses in the write set was not worth the effort.

2.1.2 Low-Cost Read-Only Transactions

One of the goals of the proposed methodology's design is an efficient execution of read-only transactions, as they dominate usage patterns in many applications. To execute a read-only transaction:

1. Sample the global version number: Load the current value of the global version number and store it in a local variable called read-version (rv).
2. Run through a virtual execution: Execute the transaction code. Each load instruction is post-validated by checking that the location's versioned write-lock is free and making sure that the lock's version field is $\leq$rv. If it is greater than rv transaction is aborted, otherwise commits.

As can be seen, the read-only implementation is highly efficient because it does not construct or validate a read set. Detection of read-only behavior of any given transaction can be done at the method level. This can be done at compile time or by simply running all methods first as read-only, and upon detecting the first transactional write, set a flag to indicate that this method should henceforth be executed in write mode.

2.2 A TL2 Algorithm for Alternating Read-Write Transactions

Consider methods which are executed transactionally, running most of the time without writing, but still incurring a write once in a while. For such methods, or approach of marking a method as a writing transaction will not produce the best possible performance. An example is a delete method on a sorted linked list in which most of the time the item is not found in the list, or an insert in which the item is already found. In such cases the transaction is mostly a read-only transaction, and this transaction incurs little overhead apart from the transactional operations that have to do with traversing the list.

For such transactions the cost of collecting a read-set can be avoided not only in the common case but in fact in all cases. Moreover, we can avoid failing the transaction if we were not collecting a read set and suddenly incurred a write operation.

We do this using the following variation of the TL2 algorithm for mixed read/write transaction.

1. Sample global version number: Load the current value of the global version number and store it in a local variable called the read-version number (rv).
2. Run through a virtual execution: Execute the transaction code (load and store instructions are mechanically augmented and replaced so that virtual execution does not change the shared memory's state, hence the term "virtual"). Do not maintain a read set.

If there already exists a write set the transactional load first checks (using a filter) to see if the load address already appears in the write-set. If no writes have occurred this step is skipped. Each load instruction is post-validated by checking that the location's versioned write-lock is free and making sure that the lock's version field is $\leq$rv. If it is greater than rv it suggests that the memory location has been modified after the current thread performed step 1, and the transaction is aborted.
3. Lock write set: Acquire the locks in any convenient order using bounded spinning to avoid indefinite deadlock. In case not all of these locks are successfully acquired, the transaction fails.
4. Increment Global Version Number: Upon successful completion of lock acquisition of all locks in the write-set perform an increment-and-fetch of the global version number recording the returned value in a local write-version number variable wv.
5. Rerun through the Virtual Transaction: Run again through a virtual transaction just as before (on possibly different locations though) using wv in the same role as rv, post validating that the version number for each location is $\leq$wv. We also build a write set and validate that each memory location in this new write set is in the earlier constructed write set, that is, locked by the transaction. In case the validation fails, the transaction is aborted.
6. Commit and release the locks: For each location in the write-set, store to the location the value from the new write-set and release the location's lock by setting the version value to the write-version wv and clearing the write-lock bit (this is done using a simple store). Release any locations in the first write set that might now have been included in the later write set.

The most important thing to note is that it could be that the set of locations read in our two virtual runs of the transaction might be different, yet if the write set of the second is included in the write set of the first, the committed transaction is correct. For example, when traversing a linked list, the first and second traversal passes leading to the node to be inserted or deleted differ. This is still fine, and is in fact how an optimistic fine grained locking scheme works. Note that as long as the cost of running through the transaction a second time is less costly than collecting a validating a read-set, or as long as the case of an actual write occurring is low, this approach offers a performance advantage.

2.3 A TL2 Algorithm for Static Transactions

Consider methods that are static, for example, an n location CAS operation (NCAS). For such methods in which all locations read and written are determined in advance, the TL2 algorithm offers an especially attractive implementation.

For such static transactions the read and write sets are known in advance, and as we show, revalidation can be eliminated. We do this using the following variation of the TL2 algorithm for static transaction.

1. Lock Locations to be Written: Acquire the locks for locations to be written in any convenient order using bounded spinning to avoid indefinite deadlock. In case not all of these locks are successfully acquired, the transaction fails.
2. Increment Global Version Number: Upon successful completion of lock acquisition of all locks perform a increment-and-fetch of the global version number recording the returned value in a local write-version number variable wv.
3. Validate Locations to be Read: Validate for each location in the to be read that its version number is $\leq$wv. We also verify that these memory locations have not been locked by other threads. In case the validation fails, the transaction is aborted.
4. Commit and release the locks: For each location in the write-set, store to the location the value from the new write-set and release the location's lock by setting the version value to the write-version wv and clearing the write-lock bit (this is done using a simple store).

This implementation is especially efficient since a transaction makes only a single pass over each memory location and its associated lock. This is an improvement over all know algorithms.

2.4 An Alternative Lock Implementation

An alternative approach for implementing per-location locks is a technique based on the mutual exclusion algorithm. According to an alternative algorithm, threads achieve mutual exclusion by operating on a pair of memory locations: they write to the first one, and then proceed to the second only after validating the first value. We allocate an extra word adjacent to the version value serving as the lock, and use the word's two halves as the pair of memory locations in the mutual exclusion algorithm. In most cache coherent multiprocessors it is necessary to apply a memory barrier before validating the first store, which is often equivalent in cost to atomic primitives. However, rather than apply the two-location mutual exclusion method individually on multiple locations, we perform the first writes as a batch, then apply a single memory barrier, and finally do the second writes as a batch. This way, the amount of bus communication is independent of the write-set size.

2.5 Alternative Global Version Number Implementations

There are various ways in which one could implement the global version number using in the algorithm. The key issue with the global clock implementation is that it may introduce increased traffic on the interconnect. There are various architecture dependent ways to deal with this phenomena. We describe a few below.

2.5.1 A Thread ID Based Global Version Number

One approach is to split the global version number so it included a version number and a thread id.
  1. Each version will include the thread id of the thread that last modified it.
  2. Each thread, when performing the load/CAS to increment the global version number, checks after the load to see if the global version number has changed since it last performed a transaction (note that if it fails on the CAS and retries the load/CAS then it knows the number was changed). If it has changed, then the thread does not perform the CAS, and writes the version number it loaded and its id into all locations it modifies. If the global version number has not changed, the thread must CAS a new global version number greater by one and its id into the global version and use this in each location.
  3. To read, a thread loads the global version number, and any location with a version number >rv or =rv and having an id different than that of the transaction who last changed the global version will cause a transaction failure.

This has the potential to cut the number of CAS operations on the global version number by a linear factor. It does however introduce the possibility of "false positive" failures. In the simple global version counter which is always incremented, a read of some location that saw, say, value v+n, would not fail on things less than v+n, but with the new scheme, it could be that threads 1 . . . n−1 all perform non-modifying increments by changing only the id part of a version number, leaving the value unchanged at v, and the reader also reads v for the version counter (instead of v+n as he would have in the regular scheme). It can thus fail on account of each of the writes even though in the regular scheme it would have seen most of them with values v . . . v+n−1.

2.5.2 A Hardware Clock Based Global Version Number

On new multi-core systems it may make sense to provide a coherent hardware counter or coherent hardware clock across all cores. If the system provides such a coherent hardware counter readable in user-space such that all values read are monotonically increasing (i.e. no to threads can ever read the same value) then this counter could be used in place of the software-maintained global counter. Hardware would continuously increment the counter, and software would only ever read the counter. Critically, the hardware-based counter would not generate cache-coherency traffic.

2.6 Transactional Contention Management

As described above TL2 admits live-lock failure. Consider where thread T1's read-set is A and its write-set is B. T2's read-set is B and write-set is A. T1 tries to commit and locks B. T2 tries to commit and acquires A. T1 validates A, in its read-set, and aborts as a B is locked by T2. T2 validates B in its read-set and aborts as B was locked by T1. We have mutual abort with no progress. To provide liveness we use bounded spin and a back-off delay at abort-time, similar in spirit to that found in CSMA-CD MAC protocols. The delay interval is a function of (a) a random number generated at abort-time, (b) the length of the prior (aborted) write-set, and (c) the number of prior aborts for this transactional attempt.

We found that we do not need mechanisms for one transaction to abort another to allow progress/liveness even in encounter mode.

2.7 Mixed Transactional and Non-Transactional Memory Management

For type-safe garbage collected managed runtime environments such as Java any of the TL2 lock-mapping policies (PS or PO) are safe, as the GC assures that transactionally accessed memory will only be released once no references remain to the object. In C or C++ TL2 uses its PS/Commit locking scheme to allow the C programmer to use normal malloc( ) and free( ) operations to manage the lifecycle of structures containing transactionally accessed shared variables. Using PS was also suggested in, but given that they used an encounter order locking scheme, suggests that it is not clear how it works.

Concurrent mixed-mode transactional and non-transactional accesses are proscribed. When a particular object is being accessed with transactional load and store operations it must not be accessed with normal non-transactional load and store operations. (When any accesses to an object are transactional, all accesses must be transactional). In PS/− Commit mode an object can exit the transactional domain and subsequently be accessed with normal non-transactional loads and stores, but we must wait for the object to quiesce before it leaves.

In the following discussion we will assume for the sake of simplicity that there is one lock associated with an object though if there is more than one lock one would need to perform the quiescing operation we describe for all locks associated with an object.

There can be at most one transaction holding each transactional lock, and quiescing means waiting for that lock to be released, implying that all pending transactional stores to the location have been "drained", before allowing the object to exit the transactional domain and subsequently to be accessed with normal load and store operations. Once it has quiesced, the memory can be freed and recycled in a normal fashion, because any transaction that may acquire the lock and reach the disconnected location will fail its read-set validation.

To motivate the need for quiescing, consider the following scenario with PS/Commit. We have a linked list of 3 nodes identified by addresses A, B and C. A node contains Key, Value and Next fields. The data structure implements a traditional key-value mapping. The key-value map (the linked list) is protected by TL2 using PS. Node A's Key field contains 1, its value field contains 1001 and its Next field refers to B. B's Key field contains 2, its Value field contains 1002 and its Next field refers to C. C's Key field contains 3, the value field 1003 and its Next field is NULL. Thread T1 calls put (2, 2002). The TL2-based put( ) operator traverses the linked list using transactional loads and finds node B with a key value of 2. T1 then executes a transactional store in B.Value to change 1002 to 2002. T1's read-set consists of A.Key, A.Next, B.Key and the write-set consists of B.Value. T1 attempts to commit; it acquires the lock covering B.Value and then validates that the previously fetched read-set is consistent by checking the version numbers in the locks converging the read-set. Thread T1 stalls. Thread T2 executes delete(2). The delete( ) operator traverses the linked list and attempts to splice-out Node B by setting A.Next to C. T2 successfully commits. The commit operator stores C into A.Next. T2's transaction completes. T2 then calls free(B). T1 resumes in the midst of its commit and stores into B.Value. We have a classic modify-after-free pathology. To avoid such problems T2 calls quiesce(B) after the commit finishes but before free( )ing B. This allows T1's latent transactional ST to drain into B before B is free( )ed and potentially reused. Note, however, that TL2 (using quiescing) did not admit any outcomes that were not already possible under a simple coarse-grained lock. Any thread that attempts to write into B will, at commit-time, acquire the lock covering B, validate A.Next and then store into B. Once B has been unlinked there can be at most one thread that has successfully committed and is in the process of writing into B. Other transactions attempting to write into B will fail read-set validation at commit-time as A.Next has changed.

The following explains why we do not use TL2 with PO in languages like C or C++. Consider another following problematic lifecycle scenario based on the A,B,C linked list, above. Lets say we using TL2 in the C language to moderate concurrent access to the list, but with PO mode where the lock word(s) are embedded in the node. Thread T1 calls put (2, 2002). The TL2-based put( ) method traverses the list and locates node B having a key value of 2. Thread T2 then calls delete (2). The delete operator commits successfully. T2 waits for B to quiesce and then calls free (B). The memory underlying B is recycled and used by some other thread T3. T1 attempts to commit by acquiring the lock covering B.Value. The lock-word is co-located with B.Value, so the CAS operation transiently changes the lockword contents. T2 then validates the read-set, recognizes that A.Next changed (because of T1's delete( ) and aborts, restoring the original lock-word value. T1 has caused the memory word underlying the lock for B.value to "flicker", however. Such modifications are unacceptable; we have a classic modify-after-free error.

We thus use PS/Commit for normal C code as the lockwords (metadata) are stored separately in type-stable memory distinct from the data protected by the locks. This provision can be relaxed if the C-code uses some type of garbage collection (such as conservative garbage collection for C, hazard pointers or Epoch-Based Reclamation) or type-stable storage for the nodes.

2.8 Mechanical Transformation of Sequential Code

As we discussed earlier, the algorithm we describe can be added to code in a mechanical fashion, that is, without understanding anything about how the code works or what the program itself does. In our benchmarks, we performed the transformation by hand. We do however believe that it may be feasible to automate this process and allow a compiler to perform the transformation given a few rather simple limitations on the code structure within a transaction.

We note that hand-crafted data structures can always have an advantage over TL2, as TL2 has no way of knowing that prior loads executed within a transaction might no longer have any bearing on results produced by transaction.

2.9 Software-Hardware Inter-Operability

Though we have described TL2 as a software based scheme, it can be made inter-operable with HTM systems on several levels.

On a machine supporting dynamic hardware transactions, transactions need only verify for each location that they read or write that the associated versioned write-lock is free. There is no need for the hardware transaction to store an intermediate locked state into the lock word(s). For every write they also need to update the version number of the associated stripe lock upon completion. This suffices to provide inter-operability between hardware and software transactions. Any software read will detect concurrent modifications of locations by a hardware writes because the version number of the associated lock will have changed. Any hardware transaction will fail if a concurrent software transaction is holding the lock to write. Software transactions attempting to write will also fail in acquiring a lock on a location since lock acquisition is done using an atomic hardware synchronization operation (such as CAS or a single location transaction) which will fail if the version number of the location was modified by the hardware transaction. One can also think of using a static bounded size obstruction-free hardware transaction to speed up software TL2. This may be done variously by attempting to complete the entire commit operation with a single hardware transaction, or, alternately, by using hardware transactions to acquire the write locks "in bulk". This latter approach is beneficial if bulk acquisition of the write-locks via hardware transactions is faster (has lower latency) than acquiring one write lock at a time with CAS. Since the write set is know in advance, we require only static hardware transactions. Because for many data structures the number of writes is significantly smaller than the number of reads, it may well be that in most cases these hardware transactions can be bounded in size. If all write locks do not fit in a single hardware transaction, one can apply several of them in sequence using the same scheme we currently use to acquire individual locks.

One can also use TL2 as a hybrid backup mechanism to extend bounded size dynamic hardware transactions to arbitrary size. Again, our empirical testing suggests that there is not much of a gain in this approach.

3. Correctness of the Basic TL2 Algorithm

We base the correctness of the TL2 algorithm on simple claims on the linearization of transactions. In the proof, we refer to the algorithm steps as they were defined in Section 2.1. Data-modifying transactions are linearized at the exact point in time they execute the atomic memory access in step 4 of the algorithm, while reading-only operations are linearized at step 1.

In this section, we show that successful transactions affect each other with respect to the order of their linearization points. We treat concurrently executing modifying transactions separately from concurrent read-only/modifying ones. We prove the algorithm's correctness by showing that any transaction is not affected by ones linearized later in time, and fully aware of earlier transactions.

3.1 Write-Write Conflicts

Consider $op_1$ and $op_2$, two successful modifying operations executed on a shared data structure by separate threads $t_1$ and $t_2$. Thread $t_1$ obtains $rv_1$ and $wv_1$ as its reading and writing versions, while $t_2$ receives $rv_2$ and $wv_2$. We assume w.l.o.g. that $wv_2 > wv_1$, i.e. $t_1$ was the first to execute step 4. We denote the read and write set as constructed in step 2 of the algorithm by rs(op) and ws(op), and use the notation $v_i^{(s)}(x)$ as the version value associated with address x as it was read by $op_i$ in step s of the algorithm.

In Lemma 3.1, we claim that the more recent operation, $op_2$, sees the other's data modifications as if they happened atomically, and in Lemma 3.2 we show that $op_1$ is not aware of the modifications done by $op_2$.

LEMMA 3.1. For all addresses $x \in ws(op_1) \cap rs(op_2)$, if there was no successful operation op' with $wv_1 < wv' < wv_2$ and $x \in ws(op')$, then $op_2$ reads from x the same value $op_2$ has written in it.

Proof. Assume by way of contradiction that $op_2$ reads a different value. One of the following must be true:

1. $op_2$ read x before $op_1$ wrote to it. Since $op_1$ needs x locked during steps 4 and 5 in the algorithm and since it was the first to execute step 4, we know that $op_2$ was in step 5 later than the time x was locked by $op_1$ while executing step 3. From the success of $op_2$'s validation in step 5, x must have been released by $op_1$, and $v_2^{(5)}(x) \geq wv_1$.

In step 5, $op_2$ verified that $v_2^{(5)}(x) \leq rv_2$. Therefore, we get that $rv_2 \geq wv_1$, which means that $op_2$ executed step 1 after $op_1$ was in step 4. When $op_2$ was in step 2 doing the virtual execution, it verified that while reading x, there was no active lock on it by checking its version before and after the load. As x was not locked when read by $op_2$, it must have been released by $op_1$, and its step 2 version $v_2^{(2)}(x) \geq wv_1$. This contradicts with the assumption that $op_2$ read from x before $op_1$ wrote to it.

2. There exists op' that wrote into x later than $op_1$ and earlier than the time $op_2$ started step 3 in the algorithm.

It follows that op' executed step 4 earlier than $op_2$. Since both $op_1$ and op' needed to lock x and $op_1$ did it first, we have that op' executed step 4 later than $op_1$.

Therefore, $ww_1 < wv' < wv_2$, contradicting the Lemma's predicate.

The above contradictions conclude the proof of the lemma.

LEMMA 3.2. For simplicity, we will assume that stored values are unique. If $x \in rs(op_1) \cap ws(op_2)$, then $op_1$ reads from x a different value than the one $op_2$ writes there.

Proof. If $op_1$ reads the value written to x by $op_2$, it does it while in step 2. $op_2$ cannot possibly execute step 6 earlier than $op_1$ does step 3, because $wv_1 < wv_2$, which means that $op_2$ gets to step 4 later than $op_1$.

3.2 Read-Write Conflicts

We now define $op_2$ as a successful reading only operation. We define $op_1$ to take effect before $op_2$ by executing step 4 before $op_2$ reads $rv_2$ in step 1. In Lemma 3.3 we claim that $op_2$ sees the modifications of $op_1$ as if they took place atomically.

LEMMA 3.3. If $x \in ws(op_1) \cap rs(op_2)$ and there does not exist a successful operation op' with $wv' > wv_1$ that executes step 4 before $op_2$ executes step 1, then $op_2$ reads from x the same value $op_1$ has written to it.

Proof. Assume by way of contradiction that $op_2$ returns a different value. One of the following must be true:

1. $op_2$ read x before $op_1$ wrote to it. Impossible since $op_2$ started when $op_1$ was in step 4, holding the lock on x at least until the time it wrote to x in step 6. $op_2$ checks the lock and version before and after reading from x. If it read from x before $op_1$ wrote there, the first check must have found an occupied lock and the operation would have failed.

2. There exists a successful operation op' that wrote a value val' to x before $op_2$ read from it. From the lemma, op' either executes step 4 after $op_2$ does step 1, or $wv' < wv_1$.

In the first case, $wv' > rv_2$, so when $op_2$ reads the value written to x by op', it does it after the lock has been released (because of the lock validations before and after the load,) and fails as $v_2^{(2)}(x) \geq wv' > rv_2$.

In the second case, op' executes step 4 earlier than $op_1$, and since both must lock x, $op_1$ executes step 6 later. $op_2$ starts after $op_1$ did step 4, but since it succeeds, by the time it post-validates x, $op_1$ has released the lock overriding val'.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present disclosure. As such, the foregoing description of embodiments of the present application is not intended to be limiting. Rather, any limitations to the invention are presented in the following claims. Note that the different embodiments disclosed herein can be combined or utilized individually with respect to each other.

We claim:

1. A method comprising:
   at one or more computers,
   maintaining a set of shared data utilized by multiple processes executing in parallel,
   providing a globally accessible version information variable that changes over time,
   for each of at least two variables stored in the set of shared data, maintaining a corresponding location to store a respective instantaneous data value associated with the globally accessible version information variable,
   receiving a first query for a current data value associated with the globally accessible version information variable around a respective start time of a transaction executed by a given process of the multiple processes,
   providing the current data value associated with the globally accessible version information variable to the given process,
   after receiving the first query and after the start time of the transaction, receiving a second query associated with the transaction for respective version information associated with a corresponding variable read from the shared data and used to produce a respective transaction outcome associated with the transaction, the respective version information set to a respective value of the globally accessible version information variable at a time when the corresponding variable was last written to by one of the multiple processes, and
   forwarding the respective version information associated with the corresponding variable enabling the given process to abort the transaction if the respective version information indicates that the corresponding variable in the set of shared data was modified by another one of the multiple processes after the respective start time of the transaction.

2. A method as in claim 1, wherein maintaining the corresponding location to store the data value associated with the globally accessible version information variable enables each of the multiple processes to identify a relative time when a corresponding variable in the set of shared data was modified.

3. A method as in claim 1 further comprising:
   enabling each of the multiple processes to access a current data value of the globally accessible version information variable and write the current data value of the globally accessible version information variable to a corresponding location associated with a respective variable in the set of shared at a time when the respective variable is modified.

4. A method as in claim 1 further comprising:
   enabling the multiple processes to increment the globally accessible version information variable at a commit time when a respective one of the multiple processes attempts to modify contents of shared data utilized by the multiple processes.

5. A method as in claim 1 further comprising:
for each of the at least two variables stored in the set of shared data, maintaining a corresponding location to store respective lock information indicating whether a given one of the multiple processes currently has a lock on a respective data variable in the set of shared data, presence of the lock preventing other processes from accessing the respective data variable.

6. A method as in claim 1 further comprising:
for each of at least two variables stored in the set of shared data, maintaining a corresponding location to store respective version information representing an absolute version of a respective data variable in the set of shared data.

7. A method as in claim 1 further comprising:
for each of the at least two variables stored in the set of shared data:
i) maintaining a corresponding first location to store respective lock information indicating whether a given one of the multiple processes currently has a lock on a respective data variable in the set of shared data, presence of the lock preventing other processes from accessing the respective data variable,
ii) maintaining a corresponding second location to store respective version information representing an absolute version of a respective data variable in the set of shared data, and
iii) maintaining the first corresponding location and the second corresponding location in a same word accessible by each of the multiple processes.

8. A method as in claim 1 further comprising:
enabling the multiple processes to compete and secure an exclusive lock with respect to at least one portion of the shared data to prevent other processes from modifying the at least one portion of the shared data.

9. A method as in claim 1, wherein providing the globally accessible version information variable includes enabling modification of the globally accessible version information variable each time one of the multiple processes modifies contents of the shared data.

10. A method as in claim 1 further comprising:
receiving a first query for a current data value associated with the globally accessible version information variable at a respective start time of a transaction executed by a given process of the multiple processes;
providing the current data value associated with the globally accessible version information variable to the given process around the start time of the transaction;
during a respective commit phase in which the shared data is modified after completion of the transaction by the given process, enabling the given process to:
i) obtain locks associated with each of multiple portions of the shared data;
ii) verify that version information, as recorded based on respective data values associated with the globally accessible version information variable, associated with a group of variables read from the shared data during execution of the transaction indicate that such variables were not modified by other processes during execution of the transaction by the given process.

11. A method as in claim 10 further comprising:
enabling the given process to modify the globally accessible version information variable some time after obtaining the locks associated with each of the multiple portions of shared data to notify the other processes of a respective modification to the shared data.

12. A computer environment including a global space accessible by multiple processes, the computer environment comprising:
one or more computers configured to
maintain a set of shared data utilized by multiple processes executing in parallel,
maintain a globally accessible version information variable that changes over time,
for each of at least two variables stored in the set of shared data, maintain a corresponding location to store a respective instantaneous data value associated with the globally accessible version information variable,
receive a first query for a current data value associated with the globally accessible version information variable around a respective start time of a transaction executed by a given process of the multiple processes,
provide the current data value associated with the globally accessible version information variable to the given process,
after receiving the first query and after the start time of the transaction, receive a second query associated with the transaction for respective version information associated with a corresponding variable read from the shared data and used to produce a respective transaction outcome associated with the transaction, the respective version information set to a respective value of the globally accessible version information variable at a time when the corresponding variable was last written to by one of the multiple processes, and
forward the respective version information associated with the corresponding variable enabling the given process to abort the transaction if the respective version information indicates that the corresponding variable in the set of shared data was modified by another one of the multiple processes after the respective start time of the transaction.

13. A computer environment as in claim 12 wherein the one or more computers are further configured to:
enable each of the multiple processes to access a current data value of the globally accessible version information variable and write the current data value of the globally accessible version information variable to a corresponding location associated with a respective variable in the set of shared at a time when the respective variable is modified.

14. A computer environment as in claim 12 wherein the one or more computers are further configured to:
enable the multiple processes to increment the globally accessible version information variable at a commit time when a respective one of the multiple processes attempts to modify contents of shared data utilized by the multiple processes.

15. A computer environment as in claim 12 wherein the one or more computers are further configured to:
receive a first query for a current data value associated with the globally accessible version information variable at a respective start time of a transaction executed by a given process of the multiple processes;
provide the current data value associated with the globally accessible version information variable to the given process around the start time of the transaction;
during a respective commit phase in which the shared data is modified after completion of the transaction by the given process, enable the given process to:

i) obtain locks associated with each of multiple portions of the shared data;

ii) verify that version information, as recorded based on respective data values associated with the globally accessible version information variable, associated with a group of variables read from the shared data during execution of the transaction indicate that such variables were not modified by other processes during execution of the transaction by the given process.

16. A computer system comprising:

a processor;

a memory unit that stores instructions associated with an application executed by the processor; and an interconnect coupling the processor and the memory unit, enabling the computer system to execute the application and perform operations of:

maintaining a set of shared data utilized by multiple processes executing in parallel, providing a globally accessible version information variable that changes over time, for each of at least two variables stored in the set of shared data, maintaining a corresponding location to store a respective instantaneous data value associated with the globally accessible version information variable, receiving a first query for a current data value associated with the globally accessible version information variable around a respective start time of a transaction executed by a given process of the multiple processes, providing the current data value associated with the globally accessible version information variable to the given process, after receiving the first query and after the start time of the transaction, receiving a second query associated with the transaction for respective version information associated with a corresponding variable read from the shared data and used to produce a respective transaction outcome associated with the transaction, the respective version information set to a respective value of the globally accessible version information variable at a time when the corresponding variable was last written to by one of the multiple processes, and forwarding the respective version information associated with the corresponding variable enabling the given process to abort the transaction if the respective version information indicates that the corresponding variable in the set of shared data was modified by another one of the multiple processes after the respective start time of the transaction.

17. A computer system as in claim 1, wherein maintaining the corresponding location to store the data value associated with the globally accessible version information variable enables each of the multiple processes to identify a relative time when a corresponding variable in the set of shared data was modified.

18. A computer system as in claim 16 further supporting operations of:

for each of the at least two variables stored in the set of shared data:

i) maintaining a corresponding first location to store respective lock information indicating whether a given one of the multiple processes currently has a lock on a respective data variable in the set of shared data, presence of the lock preventing other processes from accessing the respective data variable, ii) maintaining a corresponding second location to store respective version information representing an absolute version of a respective data variable in the set of shared data, and iii) maintaining the first corresponding location and the second corresponding location in a same word accessible by each of the multiple processes.

* * * * *

UNITED STATES PATENT AND TRADEMARK OFFICE
CERTIFICATE OF CORRECTION

PATENT NO.       : 7,669,015 B2                                                   Page 1 of 1
APPLICATION NO.  : 11/475814
DATED            : February 23, 2010
INVENTOR(S)      : Dice et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 557 days.

Signed and Sealed this

Eighteenth Day of January, 2011

David J. Kappos
*Director of the United States Patent and Trademark Office*